(12) United States Patent
Smith

(10) Patent No.: US 10,393,368 B2
(45) Date of Patent: Aug. 27, 2019

(54) SAW BLADE POSITIONING DEVICE

(71) Applicant: Scott L. Smith, Lincoln, ME (US)

(72) Inventor: Scott L. Smith, Lincoln, ME (US)

( * ) Notice: Subject to any disclaimer, the term of this patent is extended or adjusted under 35 U.S.C. 154(b) by 252 days.

(21) Appl. No.: 15/368,879

(22) Filed: Dec. 5, 2016

(65) Prior Publication Data

US 2018/0154469 A1  Jun. 7, 2018

(51) Int. Cl.
| | | |
|---|---|---|
| *B23D 59/00* | (2006.01) | |
| *B23D 51/08* | (2006.01) | |
| *F22B 37/58* | (2006.01) | |
| *B23D 51/02* | (2006.01) | |
| *F16M 7/00* | (2006.01) | |
| *B25B 5/08* | (2006.01) | |

(52) U.S. Cl.
CPC ............ *F22B 37/58* (2013.01); *B23D 51/025* (2013.01); *B25B 5/08* (2013.01); *F16M 7/00* (2013.01)

(58) Field of Classification Search
CPC ....... B23D 51/025; B23D 21/14; B66F 19/00; B25B 1/2489; B25B 1/2405; F16M 7/00; F01D 5/323
USPC ........ 254/104, 188.2; 248/188.2; 416/220 R; 29/281.5, 281.1; 83/178–195
See application file for complete search history.

(56) References Cited

U.S. PATENT DOCUMENTS

| | | | |
|---|---|---|---|
| 1,273,831 A | 7/1918 | Dee | |
| 2,942,092 A | 6/1960 | Cammann | |
| 3,774,352 A * | 11/1973 | Weber | B23Q 3/108 |
| | | | 254/104 |
| 4,484,560 A * | 11/1984 | Tanigawa | B23D 61/06 |
| | | | 125/15 |
| 4,576,070 A | 3/1986 | Fitzgerald | |
| 4,657,449 A | 4/1987 | Marich et al. | |
| 4,779,496 A | 10/1988 | Evans et al. | |
| 5,509,644 A * | 4/1996 | Engibarov | B23Q 3/102 |
| | | | 269/99 |
| 5,826,334 A | 10/1998 | Weeks et al. | |
| 6,702,246 B1 * | 3/2004 | Schriever | F16M 7/00 |
| | | | 248/656 |
| 7,328,879 B1 * | 2/2008 | Plangetis | F16M 7/00 |
| | | | 248/188.1 |
| 7,883,220 B2 * | 2/2011 | Michimori | G03B 21/10 |
| | | | 353/119 |
| 7,905,465 B1 * | 3/2011 | Anwar | F16M 7/00 |
| | | | 248/188.2 |
| 8,104,387 B2 | 1/2012 | Keegen et al. | |
| 9,950,399 B2 * | 4/2018 | Pedrini | B23Q 1/56 |
| 2003/0061925 A1 | 4/2003 | Milliman et al. | |
| 2005/0183559 A1 * | 8/2005 | Rue | B23D 49/08 |
| | | | 83/574 |
| 2010/0284805 A1 * | 11/2010 | Uskert | F01D 5/323 |
| | | | 415/209.3 |

* cited by examiner

*Primary Examiner* — Monica S Carter
*Assistant Examiner* — Mahdi H Nejad
(74) *Attorney, Agent, or Firm* — Anthony D. Pellegrini

(57) ABSTRACT

A device for positioning a reciprocating saw blade within a tube stub, such that the device is inserted into the tube stub and dynamically positions the reciprocating saw blade relative to the interior surface of the tube stub so that the saw blade can make a controlled longitudinal cut into the interior of the tube stub to a precise depth.

23 Claims, 14 Drawing Sheets

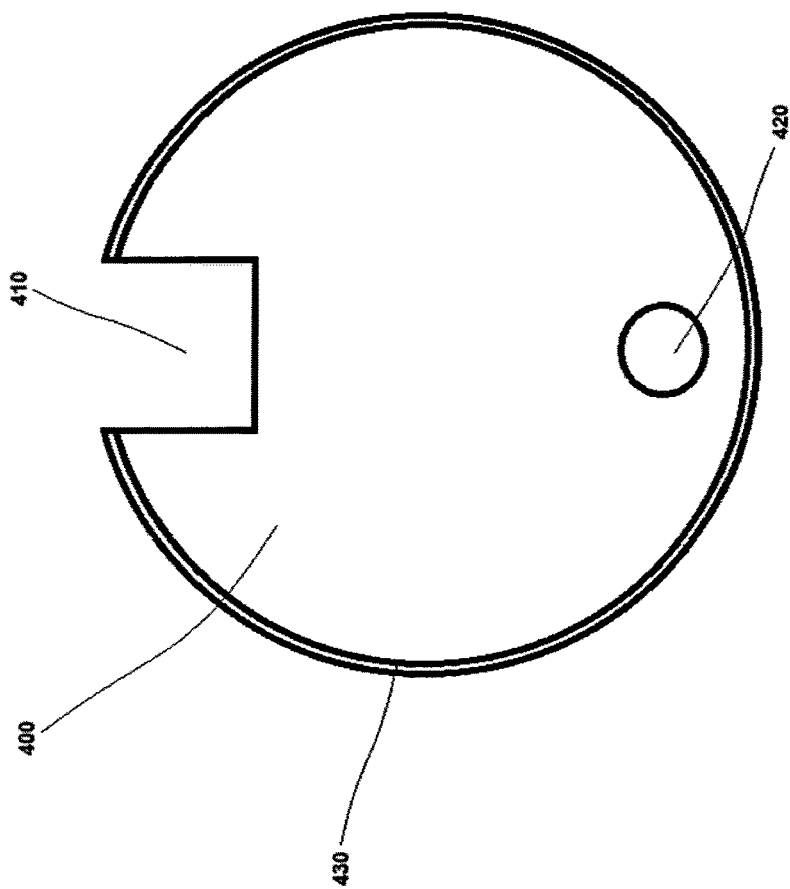
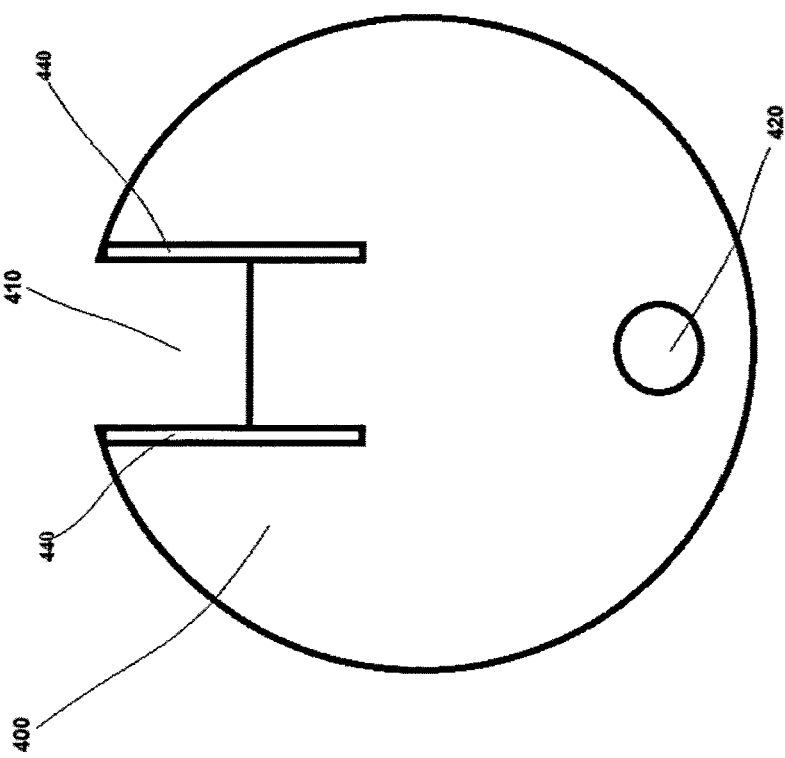
Fig. 5B
Fig. 5A

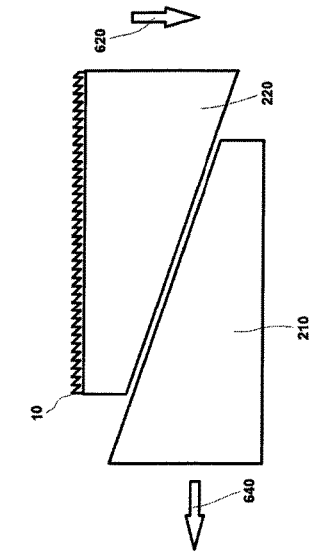
Fig. 6B
Fig. 6A
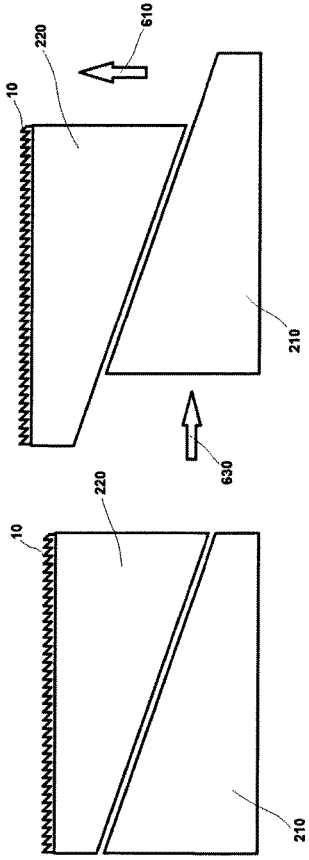
Fig. 6C
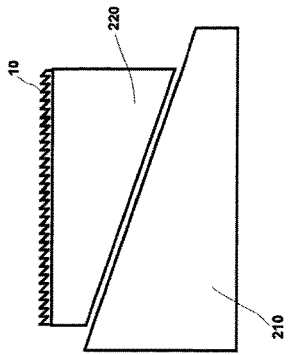
Fig. 6D
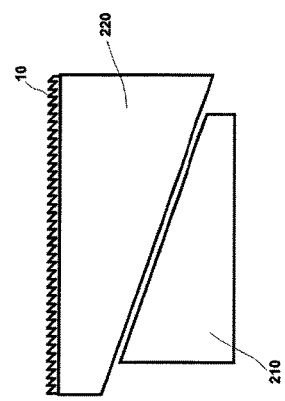
Fig. 6E

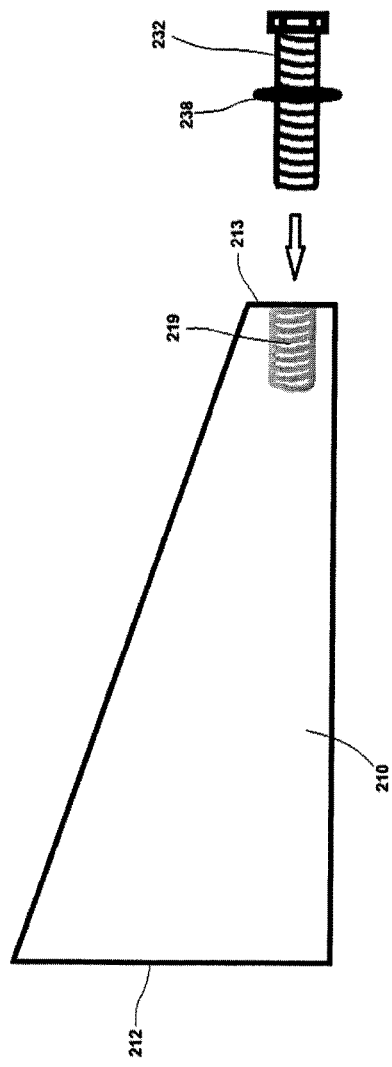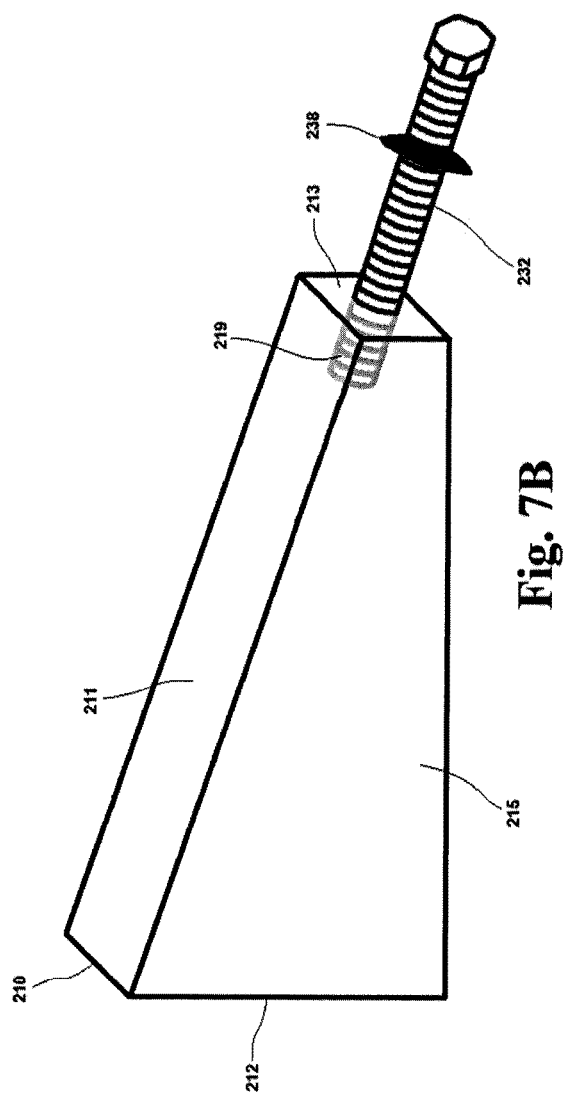
Fig. 7A
Fig. 7B

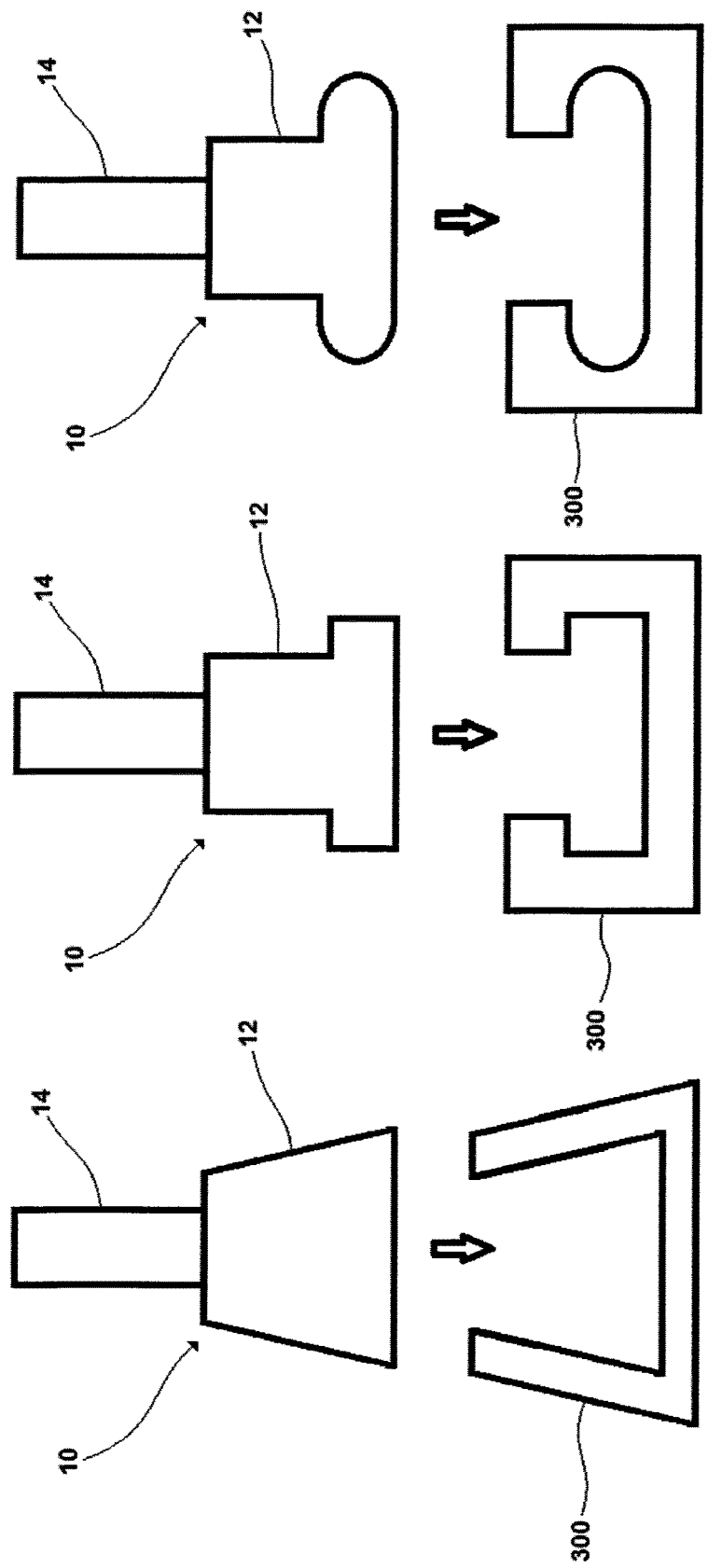

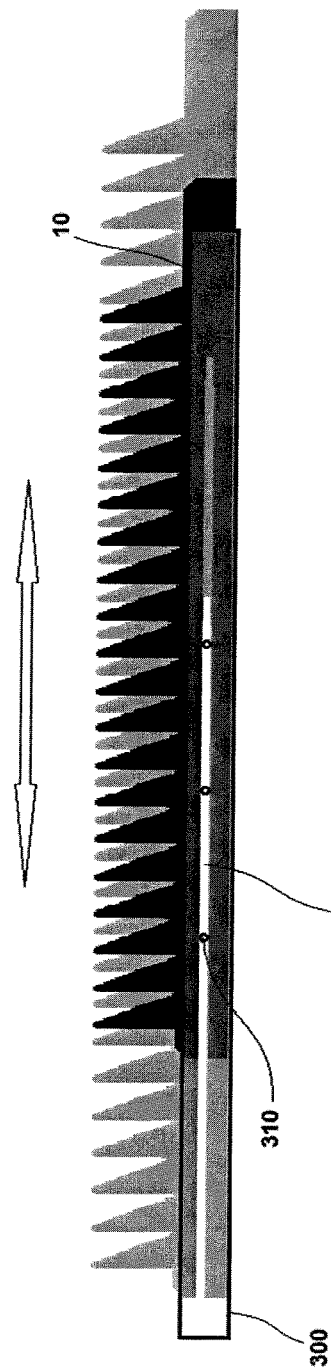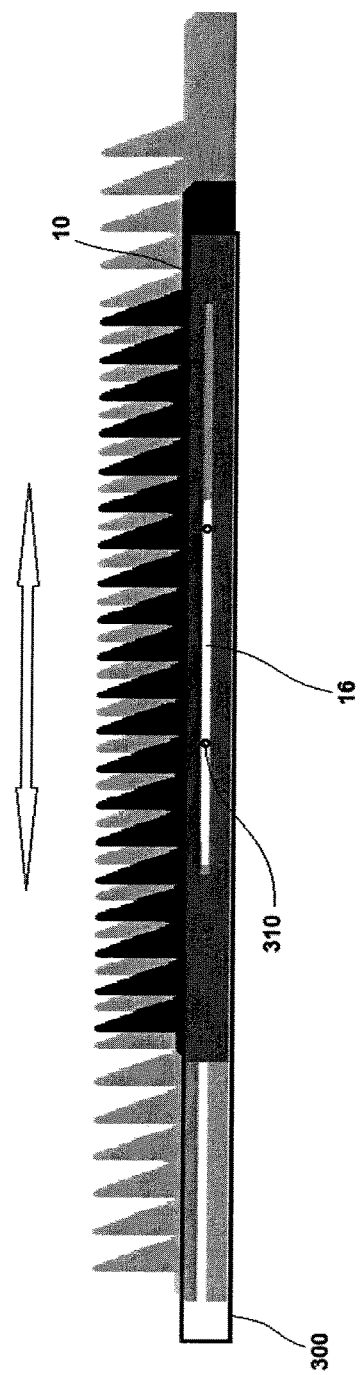

SAW BLADE POSITIONING DEVICE

BACKGROUND OF THE INVENTION

1. Technical Field

The present invention relates generally to an apparatus for assisting with making cuts in elongate tubes. In particular, the present invention relates to an apparatus which is inserted into a tube and dynamically positions a reciprocating saw blade so that the saw blade can make a controlled longitudinal cut into the interior surface of the tube to a precise depth, for the purpose of using the cut to partially collapse the tube to assist in the removal of the tube without damage to surrounding structures.

2. Description of Prior Art

Industrial and commercial plants often employ boilers 700 (see FIG. 1A) and heat exchangers 705 (see FIG. 1B) having circulation systems for transferring heat by the use of a medium such as steam, water 5, or flue gases. The circulation system involves multiple metal tubes 720, and the medium and the source of heat are located on opposite sides of the tubes 720. That is, if the medium is located outside the tubes 720, the heat source is contained within the tubes 720, and if the medium is contained within the tubes 720, the heat source is located outside the tubes 720. As an example of the former configuration, the medium may be water 5 flowing outside of the tubes 720, with the heat source being an oil-fired furnace creating very hot flue gases which flow through the tubes 720; heat is imparted to the surrounding water 5 by the hot flue gases passing through the tubes 720. As an example of the latter configuration, the medium may be water 5 which flows through the tubes 720, with the heat source being steam which flows around the outside of the tubes 720; heat is imparted to the water 5 contained within the tubes 720 from the steam surrounding the tubes 720.

The tubes 720 are typically inserted into a tube sheet 710, which is often configured as a planar member having a thickness of several inches, with aperture formed therethrough called tube seats 712. The tubes 720 pass through the tube seats 712 and are held in place by the tube sheet 710. Another configuration is a drum, which is curved rather than planar, but which also has tube seats 712 through which the tubes 720 pass. A pressure differential typically exists within the circulation system, wherein the pressures within the tubes 720 differ significantly from the pressures outside the tubes 720. Therefore, maintaining a strong seal between the tube 720 and the tube seat 712 is critical. To that end, the tubes 720 are often installed with an interference fit by a method known as tube rolling. This results in the tube 720 being forced against the tube seat 712 to produce a very snug fit of the tube 720 into the tube seat 712. This process is well known in the art.

The tubes 720 are subject to corrosion or other damage and need to be replaced from time to time. This is typically done by cutting the tubes 720 flush with the tube sheet 710 or drum and then removing the remaining section of tube 720 left within the tube sheet 710 or drum. This residual section of tube 720 is known as a tube stub 722. However, tube stub 722 removal is very difficult, because of the extremely tight fit of the tube 720 within the tube seat 712, as described above.

One method of for removing tube stubs 722 involves using a gripping tool and then forcibly extracting the tube stub 722 from the tube seat 712. There are various configurations of such tools, for example, using gripping points embedded into the inner surface of the tube stub 722 to afford purchase and then using hydraulics to extract the tube stub 722. This method, though, requires a substantial amount of force and could result in damage to the tube sheet 710. This method is also cumbersome and in many instances fails to extract the tube stub 722.

A preferred method for removing tube stubs 722 involves making a cut into the interior surface of the tube stub 722, along the longitudinal axis of the tube stub 722. Once the tube stub 722 is cut through it can be collapsed along the cut, thereby reducing its outside diameter slightly and facilitating its removal from the tube sheet 710. However, cutting a tube stub 722 requires great skill to make a cut at precisely the proper depth. A cut that is too shallow will not allow the tube stub 722 to be collapsed, and a cut that is too deep will damage the tube seat 712.

One method for making a cut in a tube stub 722 employs the use of a cutting torch, such as an acetylene torch. A worker uses the torch to create a longitudinal cut within the interior of the tube stub 722. While this method is effective, it requires great skill to be performed correctly. It is time consuming to make a cut using a torch, and it is extremely difficult to make the cut the precise depth required. Searing of the tube seat 712 often occurs. The use of a cutting torch also exposes the work environment to an open flame, increasing the danger to workers. Because the work environment oftentimes is cramped and the tube stubs 722 are exposed at inconvenient orientations, working slowly with an open flame is less than desirable.

Another method of making a cut in a tube stub 722 could involve using a saw. This would be problematic, though, because it would be very difficult to control the depth of the cut with a hand held saw; therefore, attempts to provide guided cuts, while successful in making precise cuts, have required large and expensive special purpose cutting devices, rather than inexpensive hand held saws. See, e.g., the device disclosed in Keegen, et al., U.S. Pat. No. 8,104,387 (2012).

Therefore, what is needed is an easy to use device that can position a reciprocating saw blade within a tube stub 722 and precisely guide the saw blade to make a controlled longitudinal cut to a specified depth.

It is therefore an object of the present invention to provide a device for positioning a reciprocating saw blade within a tube stub 722.

It is another object of the present invention to provide a device for positioning a reciprocating saw blade within a tube stub 722 that makes use of specialized and/or general purpose reciprocating saws and saw blades.

It is yet another object of the present invention to provide a device for positioning a reciprocating saw blade within a tube stub 722 that provides precise positioning and control of the saw blade.

It is yet another object of the present invention to provide a device for positioning a reciprocating saw blade within a tube stub 722 that provides dynamic positioning of the saw blade.

It is yet another object of the present invention to provide a device for positioning a reciprocating saw blade within a tube stub 722 that is easy to use.

It is yet another object of the present invention to provide a mechanism for securing a reciprocating saw to the device such that movement of the saw is precisely controlled, eliminating false movement of the saw which may cause the saw blade to break or scoring of the tube seat.

Other objects and advantages of the present invention will become obvious to the reader and it is intended that these objects and advantages are within the scope of the present invention. To the accomplishment of the above and related objects, this invention may be embodied in the form illustrated in the accompanying drawings. Attention is called to the fact, however, that the drawings are illustrative only, and that changes may be made in the specific construction illustrated and described within the scope of this disclosure.

SUMMARY OF THE INVENTION

The present invention comprises a saw blade positioner for aiding in correctly positioning a reciprocating saw blade within a tube stub, such that the saw blade can be used to make longitudinal cuts to the interior surface of the tube stub at precise depths. The device further dynamically positions the saw blade while it makes its cut, to increase the depth of the cut in a controlled manner. The device employs a blade guide for retaining the blade in its desired position during cutting. The blade guide keeps the saw blade aligned with the longitudinal axis of the tube stub and parallel with the inner surface of the tube stub. The blade guide is carried on a biasing mechanism. The biasing mechanism is configured to dynamically move the saw blade towards and away from the inner surface of the tube stub. The biasing mechanism is contained within a housing which is configured to fit snugly within the interior of the tube stub.

To use the device, the device is inserted into the tube stub. The biasing mechanism is positioned so that the blade guide is positioned distant from the inner surface of the tube stub. The saw blade is inserted into the blade guide, with its cutting teeth oriented away from the blade guide and towards the inner surface of the tube stub. The biasing mechanism is then positioned so that the cutting teeth of the saw blade come into contact with the inner surface of the tube stub. The reciprocating saw is activated and the saw blade begins making a cut. As the cut is made, the biasing mechanism is dynamically repositioned so that the saw blade is moved towards the inner surface of the tube stub. The biasing mechanism keeps the saw blade level so that the cut being made by the saw blade remains of uniform depth. This dynamic repositioning is performed in a controlled manner to slowly increase the depth of the cut. Once the cut is of its desired depth the biasing mechanism is moved in the opposition direction, drawing the saw blade away from the inner surface of the tube stub, and the device is removed from the tube stub.

In a preferred embodiment, the biasing mechanism comprises a pair of wedges with their inclined surfaces aligned with each other. With the second wedge placed onto the first wedge, the two wedges form a substantially rectangular shape. The base of the first wedge rests within the housing and the base of the second wedge, which contains the blade guide, is oriented parallel to the base of the first wedge and is aligned with a slot in the housing allowing access of the blade guide to the exterior of the housing. As the wedges slide against each other, the relative distance between their respective bases changes, but the wedge bases remain parallel to each other. There is a positioning means incorporated into the biasing mechanism which moves the first wedge relative to the second wedge. When the first wedge is moved in one direction along the longitudinal axis of the device the second wedge is moved in a direction out of the housing; when the first wedge is moved in an opposite direction the second wedge is moved in an opposite direction into the housing. The first wedge may be moved very slowly and over a very short distance by the positioning means; this translates into very minor movements of the second wedge, thus ensuring a controlled positioning of the blade guide and the saw blade contained therein. This positioning maintains the saw blade substantially parallel to the inner surface of the tube stub to produce a consistent depth of cut along the entirety of the cut along the longitudinal axis of the tube stub.

In another embodiment, a flexible collet may used. The collet surrounds the housing and takes up space between the device and the tube stub, ensuring a snug fit of the device within the tube stub. This allows the device to be used with tube stubs of differing inside diameters. The collet may be formed of a compressible material to accommodate differently sized tube stubs, or a series of collects, each sized slightly differently, may be used, thus necessitating only a single sized device for a range of differently sized tube stubs.

Various other objects, features and attendant advantages of the present invention will become fully appreciated as the same becomes better understood when considered in conjunction with the accompanying drawings.

DESCRIPTION OF THE DRAWINGS

FIG. 5A is a plan front view of the retaining cap.

FIG. 5B is a plan rear view of the retaining cap.

FIG. 6A is a plan side view of the first and second support wedges.

FIG. 6B is a plan side view of the first and second support wedges whereby the first support wedge is being moved in the forward direction, causing the second support wedge to move in the first direction, thereby raising the saw blade.

FIG. 6C is a plan side view of the first and second support wedges whereby the first support wedge is being moved in the rearward direction, causing the second support wedge to move in the second direction, thereby lowering the saw blade.

FIG. 6D is a plan side view of an alternative embodiment of the first and second support wedges, whereby the first support wedge is dimensioned smaller than the second support wedge.

FIG. 6E is a plan side view of another alternative embodiment of the first and second support wedges, whereby the first support wedge is dimensioned larger than the second support wedge.

FIG. 7A is a plan side view of another embodiment of the present invention, whereby the positioning means is a threaded rod configured to be fit into a threaded aperture.

FIG. 7B is a perspective side view of the embodiment of the present invention shown in FIG. 7A with the threaded rod inserted into the threaded aperture

FIG. 9A is a plan front view of one embodiment of the saw blade and blade guide, wherein the non-cutting portion of the saw blade has a dove-tailed cross section and the blade guide is configured with a dovetailed cross section.

FIG. 9B is a plan front view of another embodiment of the saw blade and blade guide, wherein the non-cutting portion of the saw blade has an inverted "T" cross section and the blade guide is configured with an inverted "T" cross section.

FIG. 9C is a plan front view of yet another embodiment of the saw blade and blade guide wherein the non-cutting portion of the saw blade has an inverted rounded "T" cross section and the blade guide is configured with an inverted rounded "T" cross section.

FIG. 9G is a plan side view of the embodiment of the saw blade depicted in FIG. 9E wherein the slot in the non-cutting portion of the saw blade is opened at one end; the saw blade is shown moving laterally within the blade guide, retained in position by the blade guide pins.

FIG. 9H is a plan side view of the embodiment of the saw blade depicted in FIG. 9F wherein the slot in the non-cutting portion of the saw blade is closed at both ends; the saw blade is shown moving laterally within the blade guide, retained in position by the blade guide pins.

DETAILED DESCRIPTION OF THE INVENTION

Figure 1A:
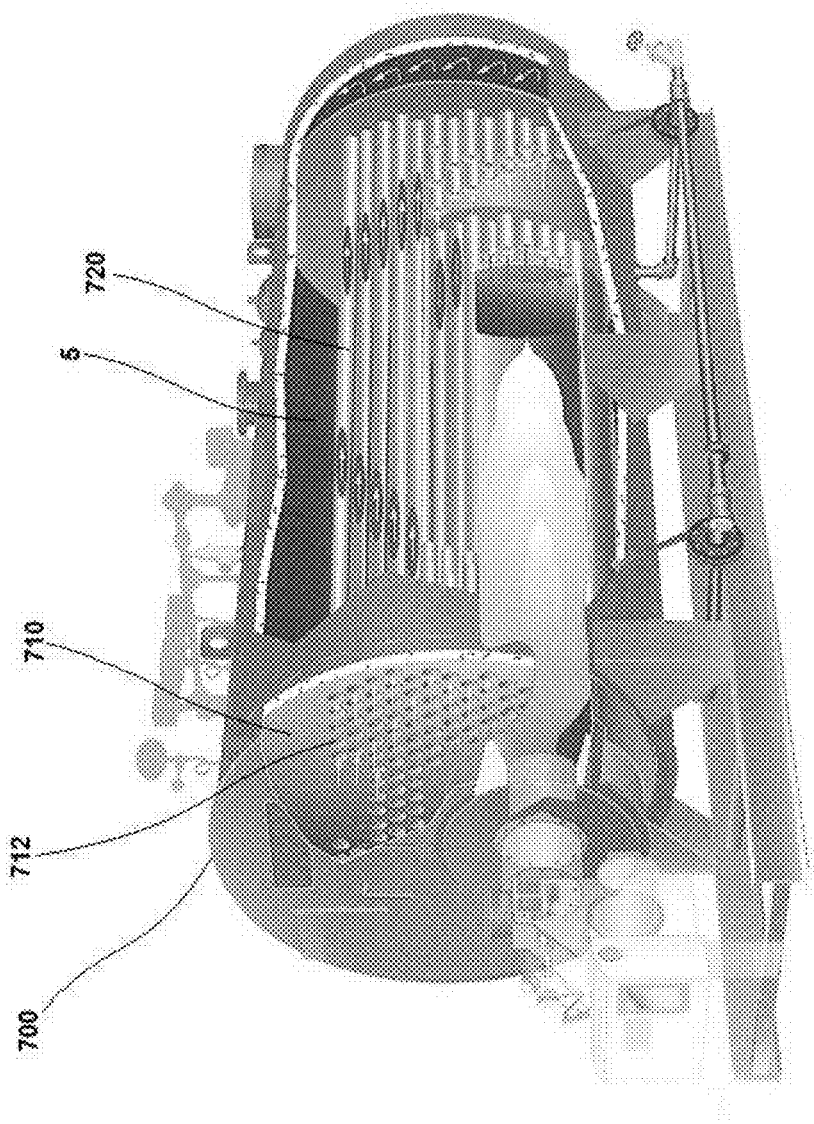
FIG. 1A is a schematic cut-away view of a typical firetube boiler.
Figure 1B:
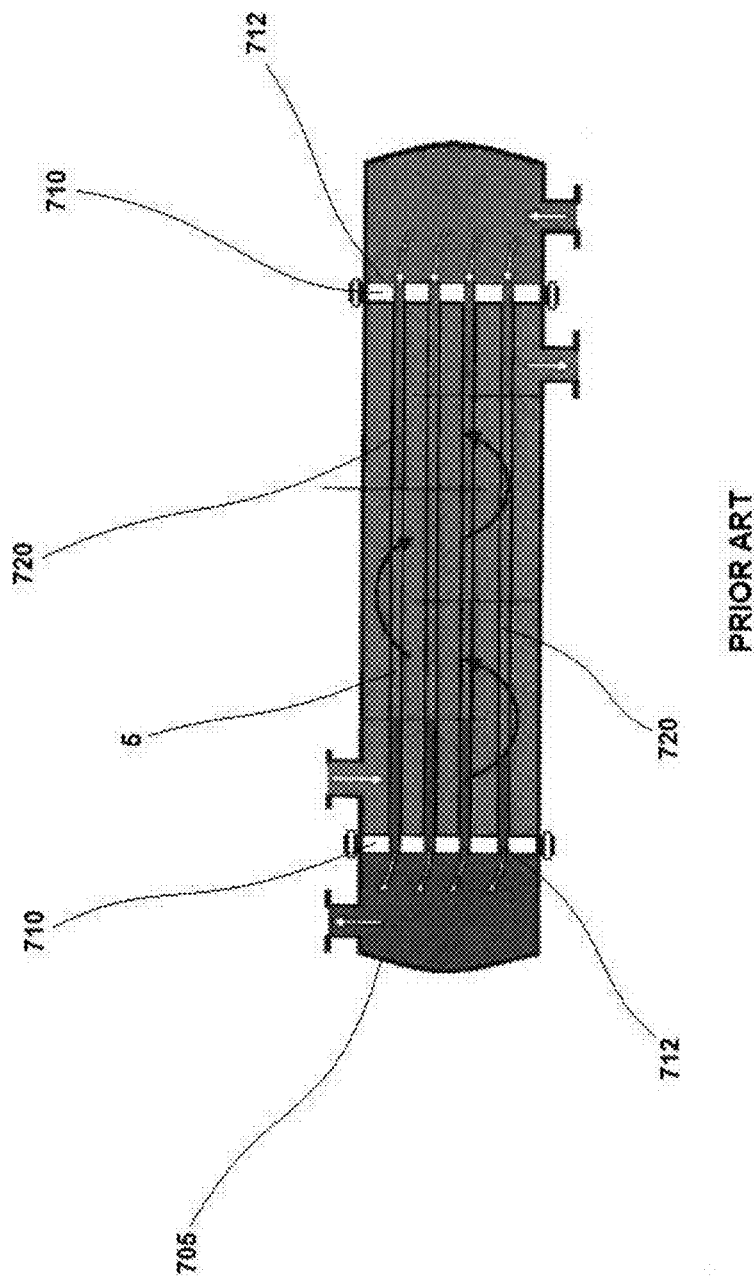
FIG. 1B is a schematic cut-away view of a typical heat exchanger.
Figure 2A:
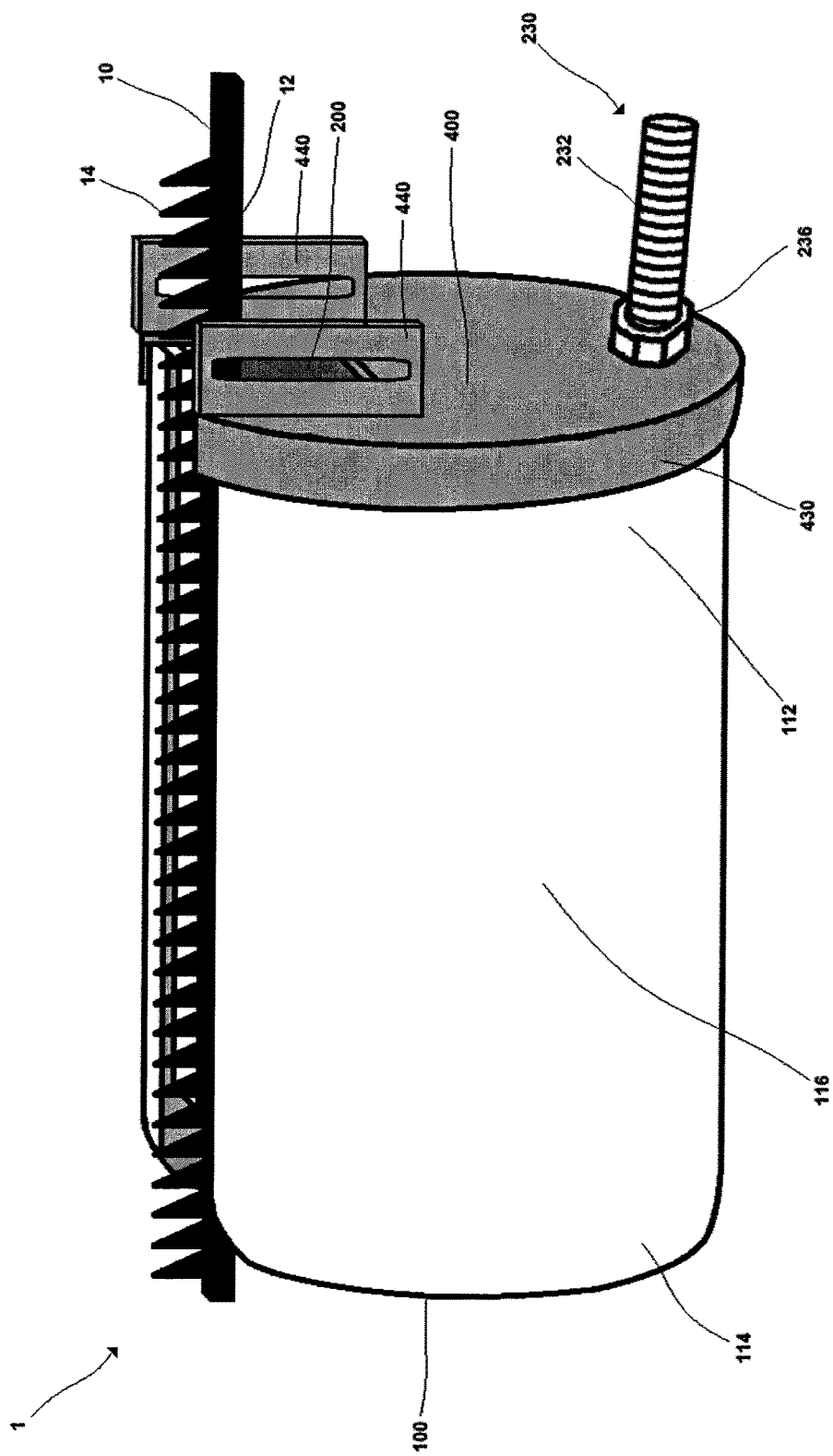
FIG. 2A is a perspective side view of one embodiment of the present invention.
Figure 2B:
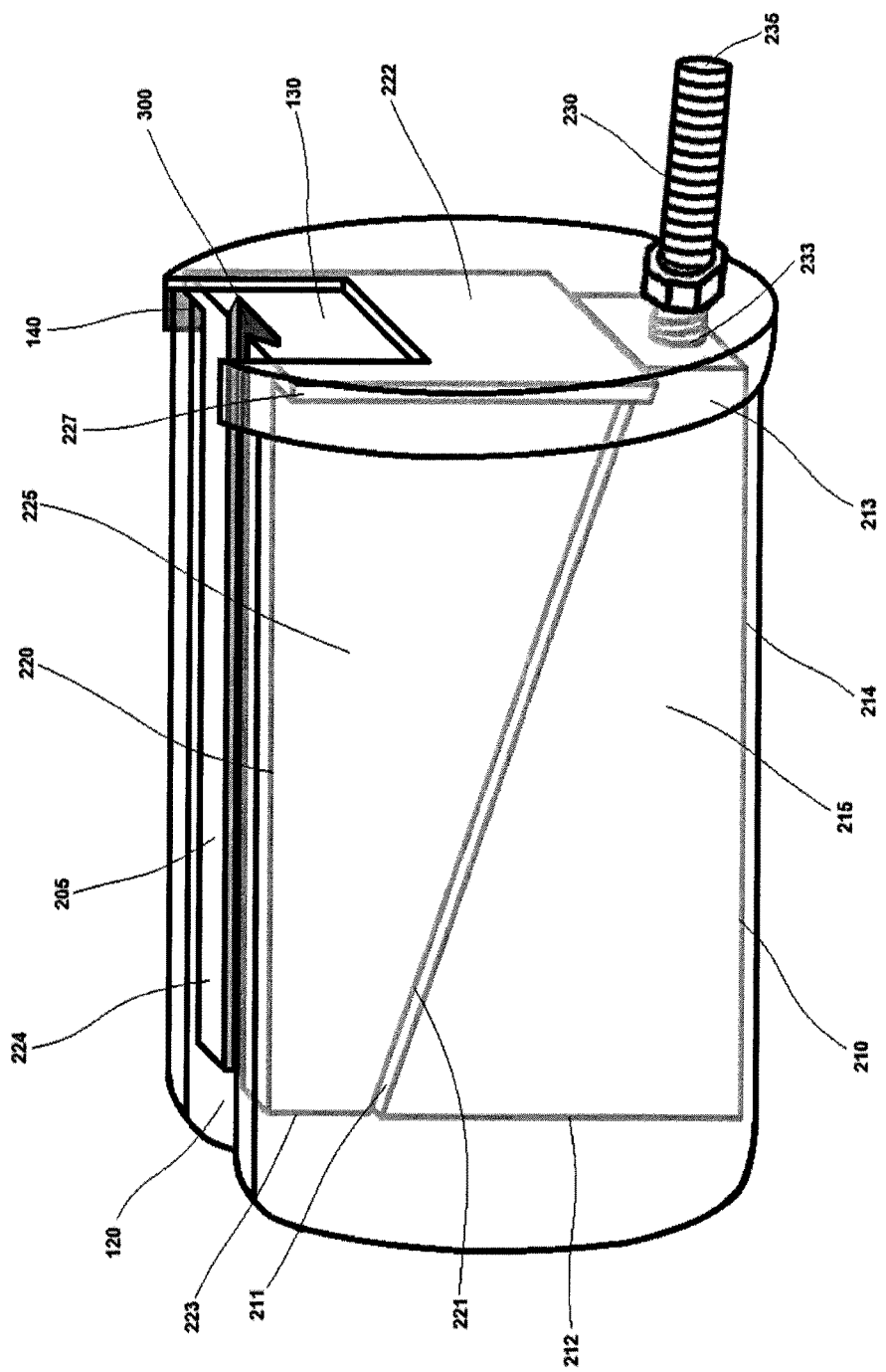
FIG. 2B is a view of the same embodiment of the present invention as shown in FIG. 2A, with the biasing mechanism shown in ghostline within the interior of the housing, and with the attachment flanges of the retaining cap removed to better reveal the access slot and blade guide.

The saw blade positioner 1 of the present invention comprises a housing 100, a blade guide 300, and a biasing mechanism 200. See FIGS. 2A and 2B. The housing 100 contains the other components of the invention and is configured to be inserted into a tube stub 722. The blade guide 300 is adapted to allow a reciprocating saw blade 10 to be retained therein, holding the saw blade 10 in place laterally as the blade moves longitudinally within the blade guide 300. The biasing mechanism 200 is configured to move the blade guide 300, and thus the saw blade 10, in either an upward direction (that is, moving out of the housing 100) or a downward direction (moving the saw blade 10 into the housing 100). See FIGS. 6A, 6B, and 6C. As more and more of the saw blade 10 is moved out of the housing 100 by the biasing mechanism 200, the cut achieved in the interior surface of the tube stub 722 by the saw blade 10 becomes ever deeper.

Figure 4A:
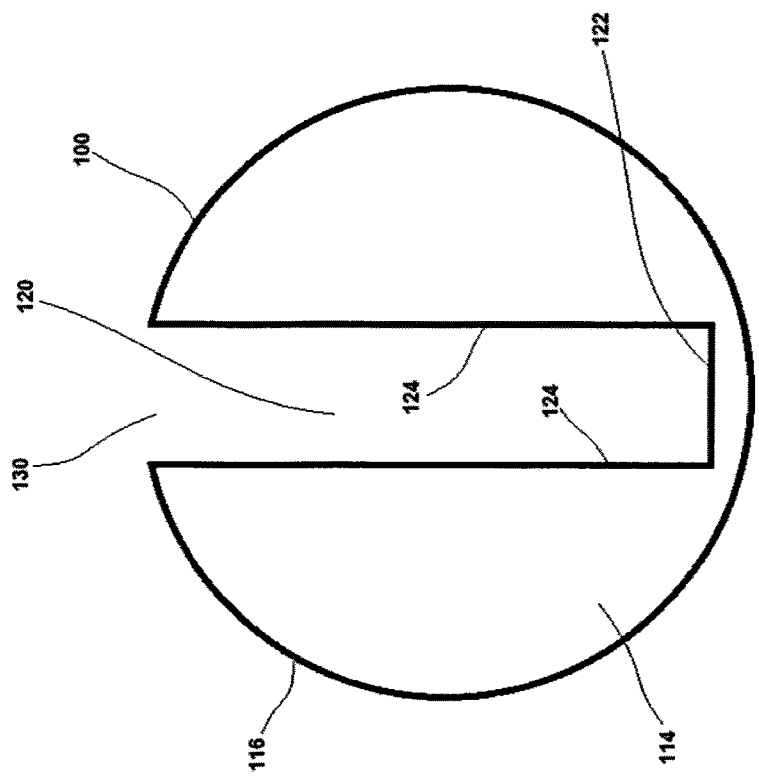
FIG. 4A is a plan front view of the proximate end of the housing.
Figure 4B:
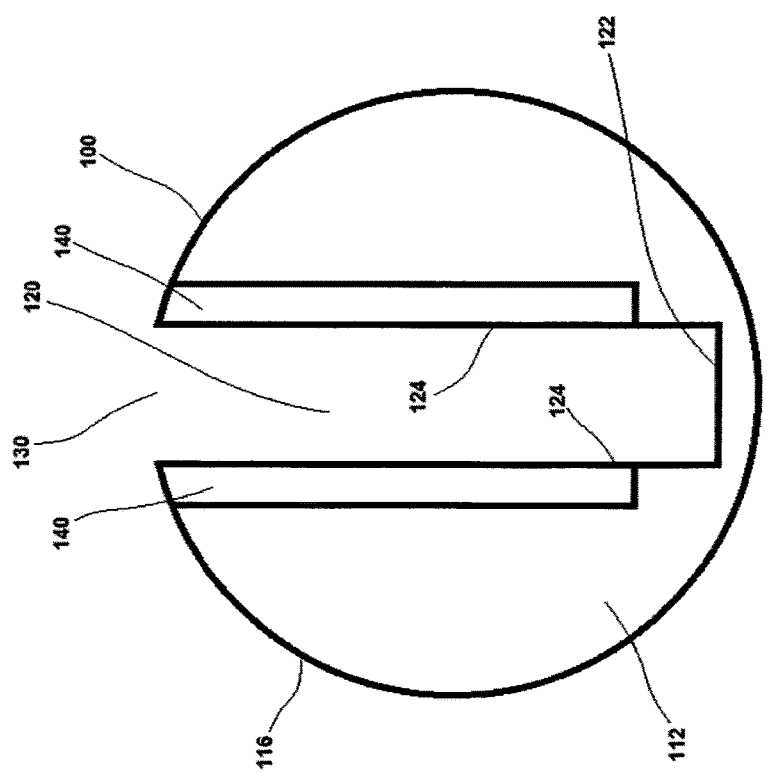
FIG. 4B is a plan rear view of the distal end of the housing.

The housing 100 is configured to be substantially cylindrical. It has a proximate end 112 and a distal end 114. Its outside diameter must be less than the inside diameter of the tube stub 722, to allow for it to be inserted therein. The housing 100 has an interior channel 120, which spans the housing 100 from its proximate end 112 to its distal end 114. The interior channel 120 is defined by an inner back wall 122, which is substantially planar, and a pair of inner side walls 124, with each side wall 124 being substantially planar each located substantially perpendicular to the inner back wall 122 and substantially parallel to each other. See FIGS. 4A and 4B. The interior channel 120 can have any suitable width, as long as the width is greater than the width of the saw blade 10. The housing 100 also has an access slot 130 passing through the exterior surface 116 of the housing 100, allowing access into the interior channel 120 of the housing 100. The access slot 130 is located opposite the inner back wall 122 of the interior channel 120 and is aligned with the longitudinal axis of the housing 100. The access slot 130 spans the housing 100 from its proximate end 112 to its distal end 114 and is configured to allow the saw blade 10 to be positioned at least partly within the interior channel 120 of the housing 100 and at least partly outside the housing 100.

The housing 100 may be made of any suitable material, such as aluminum, steel, a metal alloy (stainless steel or brass), or a composite. It may be milled from a single piece of material, or assembled from separate components. When selecting a material for the housing 100, consideration must be paid to the strength and rigidity of the material. The housing 100 cannot be allowed to flex or otherwise distort during use, or else the saw blade 10 will fail to make precise cuts.

The biasing mechanism 200 is located within the interior channel 120 of the housing 100. It has an outer surface 205 which is substantially planar and oriented substantially parallel to the inner back wall 122 of the interior channel 120 of the housing 100. The outer surface 205 of the biasing mechanism 200 is oriented towards and aligned with the access slot 130 of the housing 100. The purpose of the outer surface 205 of the biasing mechanism 200 is to support the blade guide 300. The biasing mechanism 200 is configured to be manipulated such that it dynamically moves its outer surface 205 in a first direction 610, away from the inner back wall 122 of the interior channel 120 of the housing 100, as well as in a second direction 620, towards the inner back wall 122 of the interior channel 120 of the housing 100. As such, movement of the biasing mechanism 200 moves the blade guide 300, and the saw blade 10 contained therein, in the same manner. The biasing mechanism 200 may be configured in many different ways, as shown hereunder.

The blade guide 300 is formed into the outer surface 205 of the biasing mechanism 200. It is oriented substantially parallel to the longitudinal axis of the housing 100 and is configured to accommodate the reciprocating saw blade 10. The non-cutting portion 12 of the saw blade 10 travels within the blade guide 300 and the cutting teeth 14 of the saw blade 10 extend upward from the blade guide 300. In use, the saw blade 10 is placed into the blade guide 300, the saw blade positioner 1 is placed into the tube stub 722, and the biasing mechanism 200 is manipulated to dynamically move its outer surface 205 and the blade guide 300 in either or both the first direction 610 and the second direction 620, thereby raising or lowering the saw blade 10, so that the depth of a longitudinal cut created by the saw blade 10 into the interior surface of the tube stub 722 can be precisely controlled.

In a preferred embodiment of the present invention, the biasing mechanism 200 comprises a first support wedge 210, a second support wedge 220, and a positioning means 230.

Figure 3:
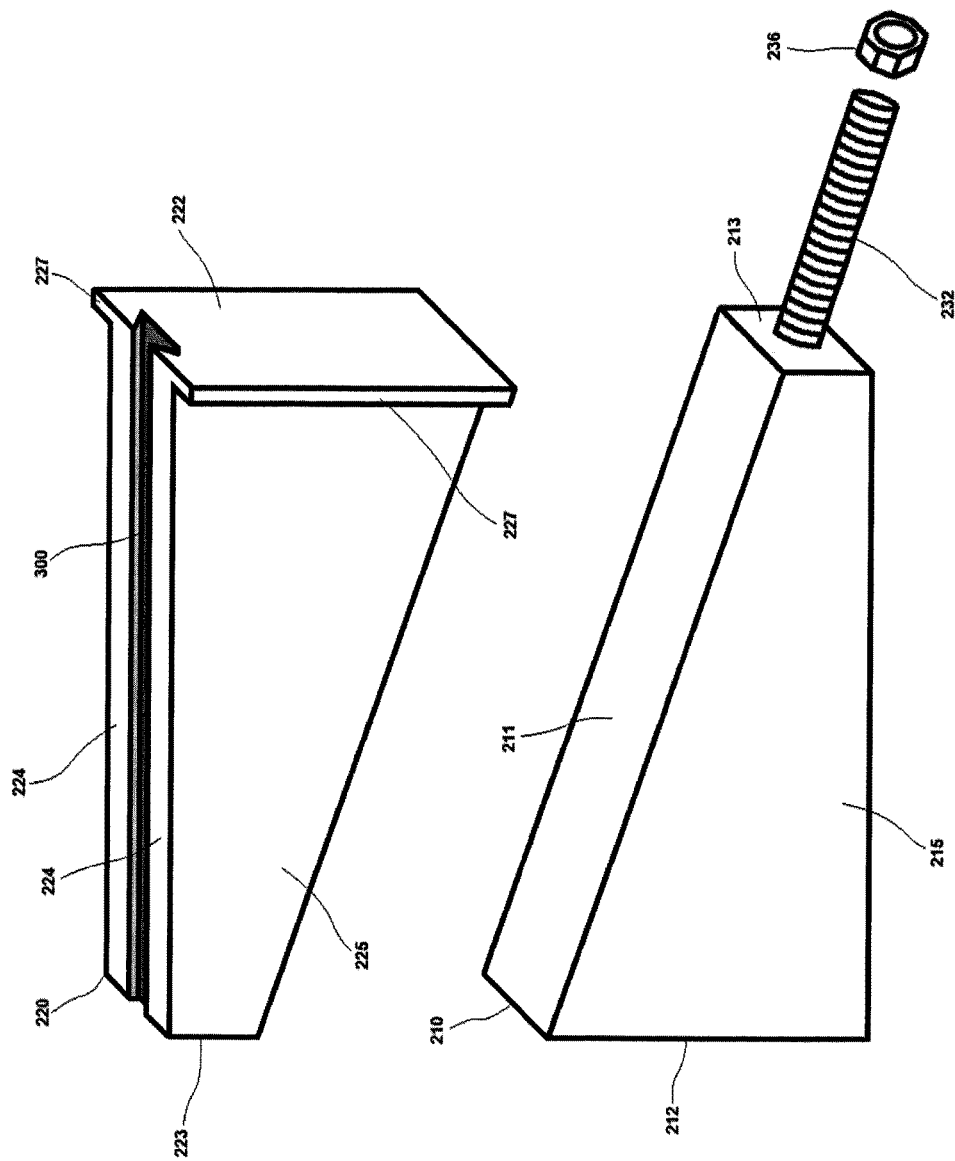
FIG. 3 is a perspective side view of details of the biasing mechanism and positioning means of the embodiment of the present invention shown in FIGS. 2A and 2B.

The first support wedge 210 has a substantially right triangle shape, though with a squared off front end. As such, it has a long end 212, a short end 213 substantially parallel to the long end 212, a base surface 214 substantially perpendicular to the long end 212 and to the short end 213, a planar inclined surface 211 running from the long end 212 to the short end 213, and a pair of side surfaces 215 substantially parallel to each other and substantially perpendicular to the base surface 214. See FIG. 3. The inclined surface 211 is oriented with respect to the long end 212 at an acute first angle. The inclined surface 211 is oriented with respect to the short end 213 at a complementary angle to the first angle (that is, 180 degrees minus the first angle). The first support wedge 210 may be made of any suitable material, such as aluminum, steel, a metal alloy (stainless steel or brass), or a composite. It may be milled from a single piece of material, or assembled from separate components. When selecting a material for the first support wedge 210, consideration must be paid to the strength and rigidity of the material. The first support wedge 210 cannot be allowed to flex or otherwise distort during use, or else the saw blade 10 will fail to make precise cuts.

In the preferred embodiment the second support wedge 220 has substantially the same shape and dimensions as the first support wedge 210. In this embodiment, when the second support wedge 220 is placed onto the first support wedge 210, with the corresponding inclined surfaces 211, 221 in contact with each other, and the long end of one support wedge aligned with the short end of the other support wedge, the pair of support wedges form a substantially rectangular shape. See FIG. 6A. In other embodiments, the second support wedge 220 may have taller or shorter long ends 222 and short ends 223, and the base surface 224 and the inclined surface 221 may be longer or shorter. See FIGS. 6D and 6E. However, in all embodiments, the angle of the inclined surface 221 of the second support wedge 220 relative to the long end 222 of the second support wedge 220 must be substantially the same as the first angle the first support wedge 210.

The first support wedge 210 is configured to be placed within the interior channel 120 of the housing 100. The base surface 214 of the first support wedge 210 is configured to be placed against and to slide along the inner back wall 122 of the interior channel 120 of the housing 100. The side surfaces 215 of the first support wedge 210 are configured to be placed against and to slide along the inner side walls 124 of the interior channel 120 of the housing 100. The second support wedge 220 is configured to be placed within the interior channel 120 of the housing 100. The inclined surface 221 of the second support wedge 220 is configured to be placed onto and to slide against the inclined surface 211 of the first support wedge 210. The base surface 224 of the second support wedge 220 is the outer surface 205 of the biasing mechanism 200. The side surfaces 225 of the second support wedge 220 are configured to be placed against and to slide along the inner side walls 124 of the interior channel 120 of the housing 100. With the first and second support wedge 220s placed into the interior channel 120 of the housing 100 as described above, the base surface 224 of the second support wedge 220 is oriented substantially parallel to the inner back wall 122 of the interior channel 120 of the housing 100.

The positioning means 230 of the biasing mechanism 200 is adapted to move the first support wedge 210 in a forward direction 630 substantially parallel to the longitudinal axis of the housing 100, and in a rearward direction 640 opposite the forward direction 630. Moving the first support wedge 210 in the forward direction 630 causes the long end 212 of the first support wedge 210 to move towards the long end 222 of the second support wedge 220, with the inclined surface 211 of the first support wedge 210 sliding along the inclined surface 221 of the second support wedge 220, thereby moving the second support wedge 220 in the first direction 610 away from the inner back wall 122 of the interior channel 120 of the housing 100 and moving the blade guide 300 through the access slot 130 of the housing 100 and out of the interior channel 120 of the housing 100. See FIG. 6B. Moving the first support wedge 210 in the rearward direction 640 causes the short end 213 of the first support wedge 210 to move towards the short end 223 of the second support wedge 220, with the inclined surface 211 of the first support wedge 210 sliding along the inclined surface 221 of the second support wedge 220, thereby allowing the second support wedge 220 to move in the second direction 620 toward the inner back wall 122 of the interior channel 120 of the housing 100 and moving the blade guide 300 through the access slot 130 of the housing 100 into the interior channel 120 of the housing 100. See FIG. 6C.

In one embodiment, the saw blade positioner 1 further comprises a retaining cap 400. The retaining cap 400 is fixedly attached to the proximate end 112 of the housing 100. Any suitable fastener can be used, such as screws, adhesives, etc. It is substantially circular and has an outside diameter greater than the inside diameter of the tube stub 722. This prevents the saw blade positioner 1 from being inadvertently inserted too deep into the tube stub 722. The retaining cap 400 has an outer lip 430 which extends over the proximate end 112 of the housing 100 and covers a portion of the exterior surface 116 of the housing 100. The retaining cap 400 has a first aperture 410 extending inward from its perimeter and aligned with the access slot 130 of the housing 100. It also has a second aperture 420 positioned closer to the inner back wall 122 of the interior channel 120 of the housing 100 than the first aperture 410 and aligned with the interior channel 120 of the housing 100, wherein at least a portion of the positioning means 230 may pass through the second aperture 420 and into the interior channel 120 of the housing 100. See FIGS. 5A and 5B. The retaining cap 400 is configured such that the blade guide 300 is accessible through the first aperture 410 of the retaining cap 400, to allow the saw blade 10 to pass through the first aperture 410 of the retaining cap 400. The retaining cap 400 also comprises a pair of attachment flanges 440 extending outwardly from the retaining cap 400. The attachment flanges 440 are positioned on either side of the first aperture 410 and are substantially parallel to each other. Each of the attachment flanges 440 has a means for allowing attachment of the reciprocating saw to the attachment flanges 440; in one embodiment, said means is an aperture through which a retaining element may be passed.

In a preferred embodiment, the housing 100 further comprises a pair of tracks 140 formed along sides of the access slot 130 of the housing 100 at the proximate end 112 of the housing 100. These tracks 140 are located adjacent to sides of the first aperture 410 of the retaining cap 400. See FIG. 4A. In this embodiment, the second support wedge 220 of the biasing mechanism 200 further comprises a pair of flanges 227 extending outward from its long end 222. See FIG. 3. These flanges 227 are configured to be placed into the pair of tracks 140 of the housing 100 such that when the second support wedge 220 moves in the first and second directions 610,620 the flanges 227 slide along the tracks 140. This stabilizes the movement of the second support wedge 220 and keeps the blade guide 300 level.

In one embodiment of the present invention the positioning means 230 is comprised of a threaded rod 232 and a threaded nut 236, wherein a first end 233 of the threaded rod 232 is fixedly attached to the first support wedge 210 at the short end 213 of the first support wedge 210. See FIG. 3. The threaded rod 232 is oriented substantially parallel to the longitudinal axis of the housing 100. It is dimensioned to fit through the second aperture 420 of the retaining cap 400. See FIG. 2B. The threaded nut 236 is dimensioned to be placed onto the second end 235 of the threaded rod 232 and is located outside of the housing 100. It is further dimensioned such that it cannot pass through the second aperture 420 of the retaining cap 400. In this embodiment, tightening the threaded nut 236 onto the threaded rod 232 causes, when the threaded nut 236 is pressed against the retaining cap 400, the threaded rod 232 to move in the forward direction 630, thereby drawing the first support wedge 210 in the forward direction 630. Loosening the threaded nut 236 from the threaded rod 232 allows the threaded rod 232 to be moved in the rearward direction 640, thereby allowing the first support wedge 210 to move in the rearward direction 640. A washer may be interposed between the threaded nut 236 and the retaining cap 400. The threaded nut 236 may further be marked with a scale, so that rotation of the threaded nut 236 can be visually correlated with the movement of the scale markings. In one configuration each marking of the scale may delineate a one-thousandth of an inch of movement of the blade guide 300.

In another embodiment of the present invention the positioning means 230 is comprised of a threaded rod 232, a retaining ring 238, and a threaded aperture 219 formed within the first support wedge 210 at its short end 213. The threaded aperture 219 is dimensioned to accommodate the first end 233 of the threaded rod 232, and the threaded rod 232 is dimensioned to fit through the second aperture 420 of the retaining cap 400 and into the threaded aperture 219. See FIGS. 7A and 7B. The retaining ring 238 is fixedly attached to the threaded rod 232 at a position proximate to the second end 235 of the threaded rod 232. It is dimensioned such that it cannot pass through the second aperture 420 of the retaining cap 400. The length of the threaded rod 232 from its first end 233 to the retaining ring 238 is substantially the same as the depth of the threaded aperture 219 plus the thickness of the retaining cap 400. Inserting the threaded rod 232 through the second aperture 420 of the retaining cap 400 and into the threaded aperture 219 and rotating it in a clockwise direction with the retaining ring 238 pressed against the retaining cap 400 causes the threaded rod 232 to pull the first support wedge 210 in the forward direction 630. Rotating the threaded rod 232 in a counter-clockwise direction allows the first support wedge 210 to be moved in the rearward direction 640. A knob may be fixed to the second end 235 of the threaded rod 232 to assist in rotating the threaded rod 232. The knob may be circular or have flat sides to facilitate the grip. Graduations may be found on the knob indicating how much a given rotation will raise the blade guide 300, as described above.

Other embodiments of the positioning means 230 are also contemplated. For example, a non-threaded rod may be affixed to the short end 213 of the first support wedge 210 in the same manner as the threaded rod 232 as described above. In this configuration, the user simply pushes or pulls on the non-threaded rod to move the first support wedge 210 in the forward or rearward direction 630,640. More complex mechanisms may also be used, involving gearing as is known in the art to move the first support wedge 210 with a very high degree of precision.

Figure 9E:
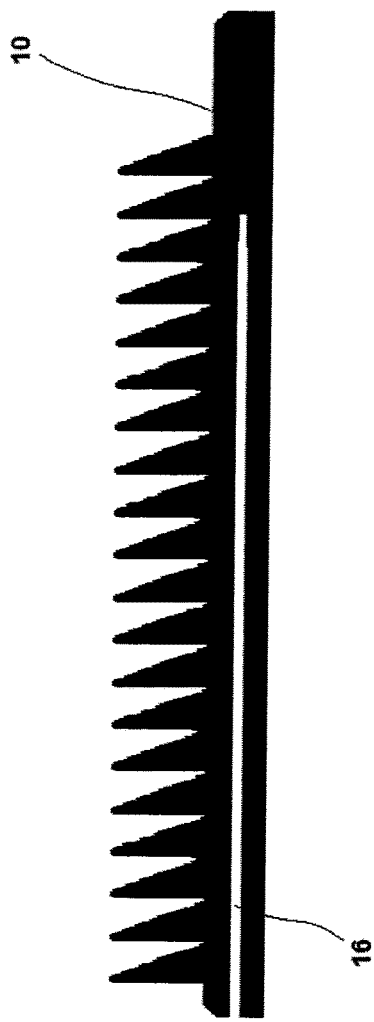
FIG. 9E is a plan side view of one embodiment of the saw blade depicted in FIG. 9D wherein the slot in the non-cutting portion of the saw blade is opened at one end.

In one embodiment of the present invention, the blade guide 300 is configured with a dovetailed cross section. See FIG. 9A. This embodiment is used with saw blades 10 having a similar dovetailed cross section of the non-cutting portion 12 of the saw blade 10. This embodiment retains the saw blade 10 within the blade guide 300 such that during use the saw blade 10 moves laterally within the blade guide 300 substantially parallel with the longitudinal axis of the housing 100 but cannot move in a direction perpendicular to the longitudinal axis of the housing 100.

In another embodiment of the present invention, the blade guide 300 is configured with an inverted "T" cross section. See FIG. 9B. This embodiment is used with saw blades 10 having a similar inverted "T" cross section of the non-cutting portion 12 of the saw blade 10. In yet another embodiment, the "T" cross section may have rounded sides. See FIG. 9C. These embodiments likewise retain the saw blade 10 within the blade guide 300 such that during use the saw blade 10 moves laterally within the blade guide 300 substantially parallel with the longitudinal axis of the housing 100 but cannot move in a direction perpendicular to the longitudinal axis of the housing 100. In other embodiments the cross section of the blade guide 300 can be of a different configuration, as long as it has substantially the same shape and dimension as the cross section of the blade guide 300.

Figure 9F:
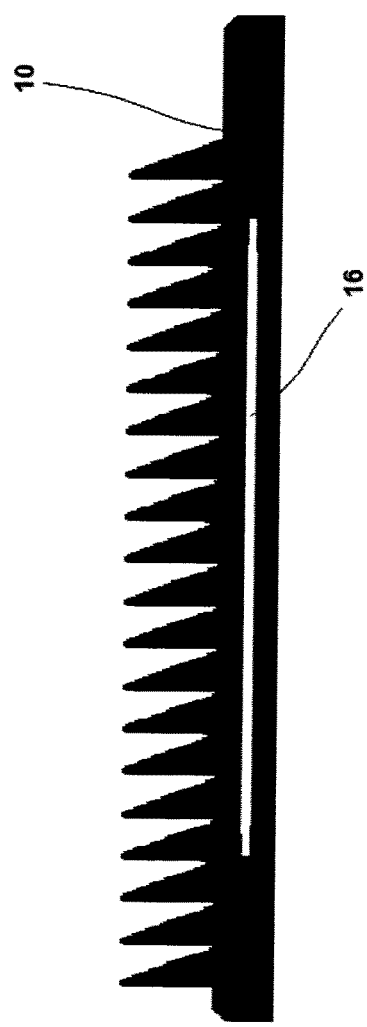
FIG. 9F is a plan side view of another embodiment of the saw blade depicted in FIG. 9D wherein the slot in the non-cutting portion of the saw blade is closed at both ends.
Figure 9D:
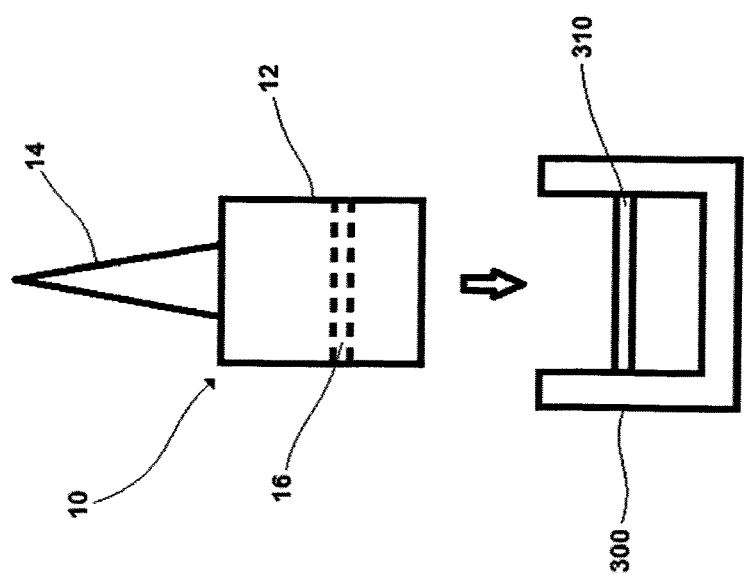
FIG. 9D is a plan front view of yet another embodiment of the saw blade and blade guide, wherein the non-cutting portion of the saw blade has a rectangular cross section and the blade guide is configured with a rectangular cross section, with the blade guide further comprising two or more horizontal pins configured to engage with a horizontal slot in the saw blade to retain the saw blade within the blade guide during use.

In yet another embodiment of the present invention, the blade guide 300 is configured to accept a saw blade 10 with a non-cutting portion 12 having a rectangular cross section. See FIG. 9D. Formed within the non-cutting portion 12 of the saw blade 10 is a longitudinal slot 16, oriented parallel to the bottom of the saw blade 10. Within the blade guide 300 are two or more pins 310. These pins are oriented perpendicular to the longitudinal axis of the housing 100 and are configured to fit within the longitudinal slot 16 of the saw blade. The saw blade 10 thus moves over the pins 310 during use, with the pins 310 retaining the saw blade 10 in place within the blade guide 300. In this embodiment the front end of the saw blade 10 may be opened, allowing the saw blade 10 to slide past the pins 310. See FIGS. 9E and 9G. In another configuration the front end of the saw blade 10 is closed, see FIGS. 9F and 9H; this gives the saw blade 10 greater strength, but also necessitates that the pins 310 be removable from the blade guide 300, wherein the pins 310 are first removed, then the saw blade 10 is placed into the blade guide 300, and then the pins 310 are reinserted through the longitudinal slot 16 of the saw blade 10 and secured to the blade guide 300.

In yet another embodiment of the present invention, the cutting teeth 14 of the saw blade 10 have a width of at least 5 millimeters. See FIGS. 9A through 9C. As such, the saw blade 10 makes a cut in the tube stub 722 of at least that width, thereby rendering a gap large enough to allow for compressing of the sides of the tube stub 722 sufficiently in order to remove it from the tube seat 712. In other embodiments the width of the cutting teeth 14 of the saw blade 10 may be somewhat narrower or wider, as desired.

In yet another embodiment of the present invention, the saw blade positioner 1 may also include a flexible collet 500. The collet 500 has a substantially cylindrical exterior 520, a substantially conical hollow interior 510, and a longitudinal slot 530 along its side. The slot 530 passes through the exterior 520 and into the interior 510 of the collet 500. The collet 500 may be made out of any suitable flexible material, such as aluminum, steel, metal alloy (stainless steel or brass), or a composite.

Figure 8A:
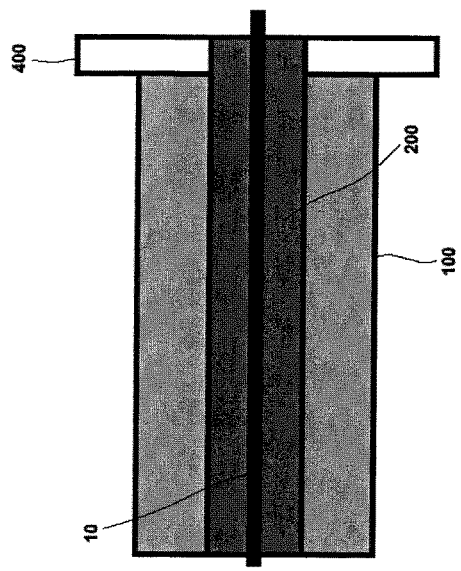
FIG. 8A is a plan top view of a flexible collet and a cylindrical housing.
Figure 8B:
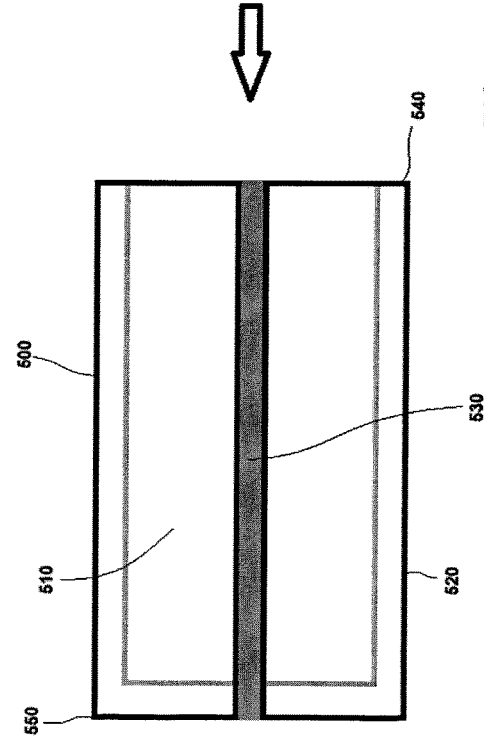
FIG. 8B is a plan top view of the flexible collet of FIG. 8A placed within the tube stub and being deformed by insertion of the cylindrical housing into the interior of the collet, with the interior of the collet and portions of the housing shown in ghostline.
Figure 8B:
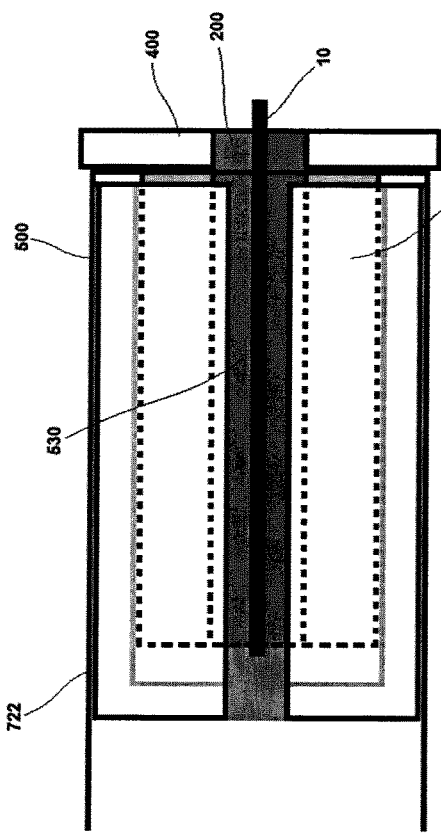

In one embodiment the collet 500 has a substantially cylindrical interior 510. In such a configuration, used where the housing 100 is substantially cylindrical, the inside diameter of the collet 500 is substantially the same from its proximate end 540 to its distal end 550. See FIG. 8A. The distal end 114 of the housing 100 is placed into the interior 510 of the collet 500 through the opened proximate end 540 of the collet 500, in a manner such that the longitudinal slot 530 of the collet 500 is aligned with the access slot 130 of the housing 100. As the housing 100 is placed into the interior 510 of the collet 500, the collet 500 flexes and the longitudinal slot 530 of the collet 500 widens, and the exterior 520 of the collet 500 expands, thereby providing a tighter (and thus more secure) fit of the saw blade positioner 1 within the tube stub 722. See FIG. 8B. When the housing 100 is withdrawn from the interior 510 of the collet 500, the longitudinal slot 530 of the collet 500 narrows and the exterior 520 of the collet 500 contracts, allowing for easier extraction of the collet 500 from the tube stub 722. Use of the collet 500 allows for the saw blade positioner 1 to be placed into tube stubs 722 that vary slightly in inside diameter. Different thickness collets 500 can be used to accommodate tube stubs 722 with greater differences in inside diameter.

Figure 8C:
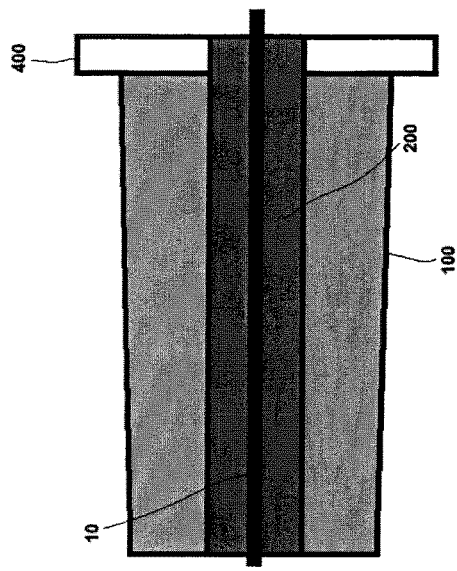
FIG. 8C is a plan top view of a flexible collet and a tapered housing.
Figure 8D:
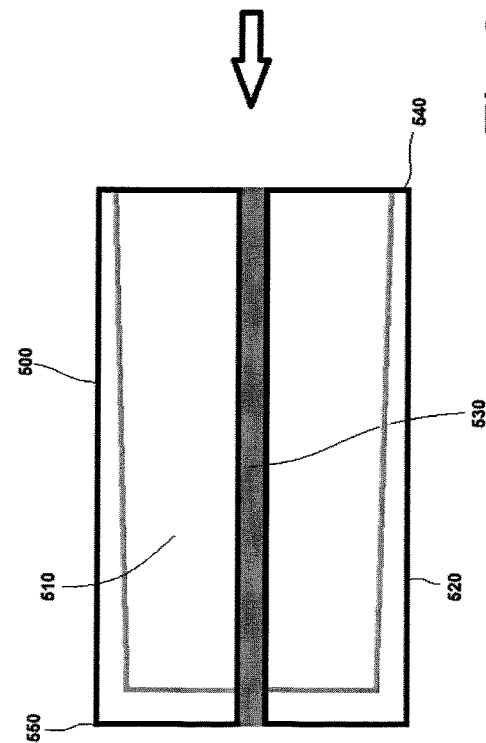
FIG. 8D is a plan top view of the flexible collet of FIG. 8C placed within the tube stub and being deformed by insertion of the tapered housing into the interior of the collet, with the interior of the collet and portions of the housing shown in ghostline.
Figure 8D:
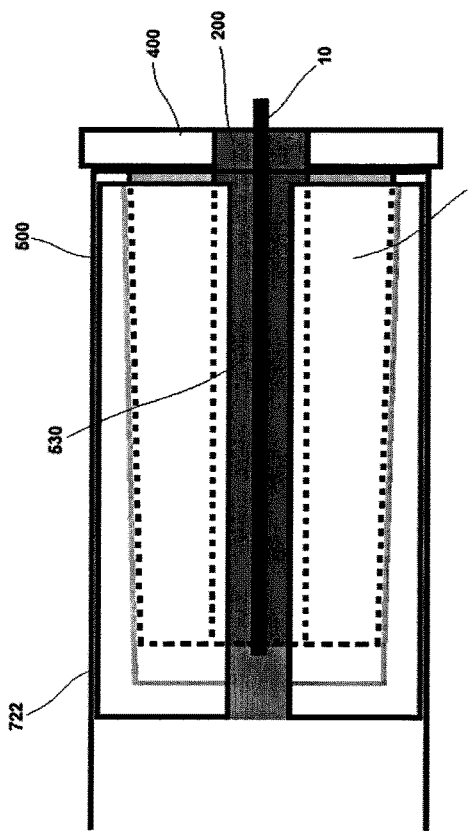

In another embodiment, the collet 500 is tapered in its interior, having a larger inside diameter at its proximate end 540 and a smaller inside diameter at its distal end 550, with both the proximate end 540 and the distal end 550 being opened. This configuration accommodates a housing 100 that is tapered, with the distal end 114 of the housing having a smaller outside diameter than its proximate end 112. See FIG. 8C. When used, the collet 500 is inserted into the tube stub 722 first, and then the housing 100 is inserted into the collet 500. As the housing 100 is inserted deeper into the collet 500, the exterior 520 of the collet 500 expands, as described above. See FIG. 8D. This configuration allows a single collet 500 and housing 100 to be used with tube stubs 720 having different inside diameters.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A saw blade positioner for aiding in correctly positioning a reciprocating saw blade within a tube stub for making longitudinal cuts to an interior surface of the tube stub, said saw blade positioner comprising a housing, said housing being substantially cylindrical, having a proximate end, a distal end, and an outside diameter less than an inside diameter of the tube stub, said housing having an interior channel, said interior channel spanning said housing from its proximate end to its distal end, said interior channel having an inner back wall, said inner back wall being substantially planar, said interior channel having a pair of inner side walls, each located substantially perpendicular to the inner back wall and substantially parallel to each other, each inner side wall being substantially planar, and said housing having an access slot through an exterior surface of said housing, said access slot in communication with said interior channel of said housing, said access slot located opposite said inner back wall of said interior channel of said housing and aligned with a longitudinal axis of said housing, said access slot spanning said housing from its proximate end to its distal end, said access slot configured to allow the saw blade to be positioned at least partly within the interior channel of said housing and at least partly outside said housing;

a biasing mechanism, said biasing mechanism being located within the interior channel of the housing, said biasing mechanism having an outer surface, said outer surface being substantially planar and oriented substantially parallel to the inner back wall of the interior channel of the housing and oriented towards and aligned with the access slot of the housing, whereby said biasing mechanism is configured to be manipulated such that it dynamically moves its outer surface in a first direction away from the inner back wall of the interior channel of the housing and dynamically moves its outer surface in a second direction towards the inner back wall of the interior channel of the housing; and a blade guide, said blade guide formed into the outer surface of the biasing mechanism, said blade guide oriented substantially parallel to the longitudinal axis of the housing, said blade guide configured to accommodate the reciprocating saw blade such that a non-cutting portion of the reciprocating saw blade travels within the blade guide and cutting teeth of the reciprocating saw blade extend upward from the blade guide;

wherein the biasing mechanism comprises a first support wedge, said first support wedge having a long end, a short end substantially parallel to the long end, a base surface substantially perpendicular to the long end and to the short end, a pair of side surfaces substantially parallel to each other and substantially perpendicular to the long end, the short end, and the base surface, and a planar inclined surface located opposite the base surface and oriented at an acute first angle to the long end, whereby the first support wedge is configured to be placed within the interior channel of the housing, the base surface of the first support wedge is configured to be placed against and to slide along the inner back wall of the interior channel of the housing, and the side surfaces of the first support wedge are configured to be placed against and to slide along the inner side walls of the interior channel of the housing;

a second support wedge, said second support wedge having a long end, a short end substantially parallel to the long end, a base surface substantially perpendicular to the long end and to the short end, a pair of side surfaces substantially parallel to each other and substantially perpendicular to the long end, the short end, and the base surface, and a planar inclined surface located opposite the base surface and oriented at an acute second angle to the long end, said second angle being substantially equivalent to the first angle, whereby the second support wedge is configured to be placed within the interior channel of the housing, with the inclined surface of the second support wedge configured to be placed onto and to slide against the inclined surface of the first support wedge, with the base surface of the second support wedge being the outer surface of the biasing mechanism, and with the side surfaces of the second support wedge configured to be placed against and to slide along the inner side walls of the interior channel of the housing; and a positioning means suitable for moving the first support wedge in a forward direction substantially parallel to the longitudinal axis of the housing and in a rearward direction opposite the forward direction;

wherein the second support wedge has substantially the same shape and dimensions as the first support wedge, the first and second support wedges are oriented so that the long end of the first support wedge is proximate to the short end of second support wedge and the short end of the first support wedge is proximate to the long end of the second support wedge, the side surfaces of the first support wedge are substantially coplanar with the side surfaces of the second support wedge, and the base surface of the first support wedge is substantially parallel to the base surface of the second support wedge;

whereby the reciprocating saw blade is placed into the blade guide of the biasing mechanism of the saw blade positioner, the saw blade positioner is placed into the tube stub, and the biasing mechanism is manipulated to dynamically move its outer surface and the blade guide formed therein in either or both the first direction and the second direction, where moving the first support wedge of the biasing mechanism in the forward direction causes the long end of the first support wedge to move towards the long end of the second support wedge, with the inclined surface of the first support wedge sliding along the inclined surface of the second support wedge, thereby moving the second support wedge in the first direction away from the inner back wall of the interior channel of the housing and moving the blade guide through the access slot of the housing and out of the interior channel of the housing, and moving the first support wedge of the biasing mechanism in the rearward direction causes the short end of the first support wedge to move towards the short end of the second support wedge, with the inclined surface of the first support wedge sliding along the inclined surface of the second support wedge, thereby allowing the second support wedge to move in the second direction toward the inner back wall of the interior channel of the housing and moving the blade guide through the access slot of the housing into the interior channel of the housing, resulting in the raising or lowering of the reciprocating saw blade, so that a depth of a longitudinal cut created by the reciprocating saw blade into the interior surface of the tube stub can be precisely controlled.

2. The saw blade positioner of claim 1 wherein the blade guide of the saw blade positioner is configured with a dovetailed cross section and the non-cutting portion of the reciprocating saw blade is configured with a cross section having substantially the same shape and dimension as the cross section of the blade guide, such that the saw blade moves laterally within the blade guide substantially parallel with the longitudinal axis of the housing but cannot move in a direction perpendicular to the longitudinal axis of the housing.

3. The saw blade positioner of claim 1 wherein the blade guide of the saw blade positioner is configured with an inverted "T" cross section and the non-cutting portion of the reciprocating saw blade is configured with a cross section having substantially the same shape and dimension as the cross section of the blade guide, such that the saw blade moves laterally within the blade guide substantially parallel with the longitudinal axis of the housing but cannot move in a direction perpendicular to the longitudinal axis of the housing.

4. The saw blade positioner of claim 1 wherein the blade guide of the saw blade positioner is configured with an inverted rounded "T" cross section and the non-cutting portion of the reciprocating saw blade is configured with a cross section having substantially the same shape and dimension as the cross section of the blade guide, such that the saw blade moves laterally within the blade guide substantially parallel with the longitudinal axis of the housing but cannot move in a direction perpendicular to the longitudinal axis of the housing.

5. The saw blade positioner of claim 1 wherein
the non-cutting portion of the saw blade is configured with a rectangular cross section, with the non-cutting portion of the saw blade further having formed therein a longitudinal slot, said longitudinal slot oriented substantially parallel to a bottom edge of the saw blade; and the blade guide of the saw blade positioner is configured with a cross section having substantially the same shape and dimension as the cross section of the non-cutting portion of the saw blade, and the blade guide further comprises two or more pins, with each pin oriented substantially perpendicular to the longitudinal axis of the housing and configured to fit within the longitudinal slot of the saw blade;

whereby the saw blade moves over the two or more pins during use, with the pins retaining the saw blade in place within the blade guide such that the saw blade moves laterally within the blade guide substantially parallel with the longitudinal axis of the housing but cannot move in a direction perpendicular to the longitudinal axis of the housing.

6. The saw blade positioner of claim 5 wherein the longitudinal slot of the saw blade extends to and through a front end of the saw blade, resulting in longitudinal slot being opened at one end.

7. The saw blade positioner of claim 5 wherein the longitudinal slot of the saw blade does not extend to and through a front end of the saw blade, resulting in longitudinal slot being closed;

wherein the two or more pins of the blade guide of the saw blade positioner are removably affixed to the blade guide;

whereby to use the saw blade with the saw blade positioner the two or more pins of the blade guide of the saw blade positioner are removed from the blade guide, the saw blade is placed within the blade guide, and the two or more pins are passed through the longitudinal slot of the saw blade and reaffixed to the blade guide, thereby retaining the saw blade within the blade guide during use.

8. The saw blade positioner of claim 1 wherein the cutting teeth of the saw blade have a width of at least 5 millimeters.

9. A saw blade positioner for aiding in correctly positioning a reciprocating saw blade within a tube stub for making longitudinal cuts to an interior surface of the tube stub, said saw blade positioner comprising
- a housing, said housing being substantially cylindrical, having a proximate end, a distal end, and an outside diameter less than an inside diameter of the tube stub,
  - said housing having an interior channel, said interior channel spanning said housing from its proximate end to its distal end, said interior channel having an inner back wall, said inner back wall being substantially planar, said interior channel having a pair of inner side walls, each located substantially perpendicular to the inner back wall and substantially parallel to each other, each inner side wall being substantially planar, and
  - said housing having an access slot through an exterior surface of said housing, said access slot in communication with said interior channel of said housing, said access slot located opposite said inner back wall of said interior channel of said housing and aligned with a longitudinal axis of said housing, said access slot spanning said housing from its proximate end to its distal end, said access slot configured to allow the saw blade to be positioned at least partly within the interior channel of said housing and at least partly outside said housing;
- a biasing mechanism, said biasing mechanism being located within the interior channel of the housing, said biasing mechanism having an outer surface, said outer surface being substantially planar and oriented substantially parallel to the inner back wall of the interior channel of the housing and oriented towards and aligned with the access slot of the housing, whereby said biasing mechanism is configured to be manipulated such that it dynamically moves its outer surface in a first direction away from the inner back wall of the interior channel of the housing and dynamically moves its outer surface in a second direction towards the inner back wall of the interior channel of the housing;
- a blade guide, said blade guide formed into the outer surface of the biasing mechanism, said blade guide oriented substantially parallel to the longitudinal axis of the housing, said blade guide configured to accommodate the reciprocating saw blade such that a non-cutting portion of the reciprocating saw blade travels within the blade guide and cutting teeth of the reciprocating saw blade extend upward from the blade guide; and
- a retaining cap,
  - said retaining cap being fixedly attached to the proximate end of the housing, said retaining cap being substantially circular and having an outside diameter greater than the inside diameter of the tube stub, said retaining cap having an outer lip extending over the proximate end of the housing and covering a portion of the exterior surface of the housing, said retaining cap having a first aperture extending inward from a perimeter of said retaining cap and aligned with the access slot of the housing, said retaining cap having a second aperture positioned closer to the inner back wall of the interior channel of the housing than the first aperture and aligned with the interior channel of the housing, wherein at least a portion of the positioning means may pass through the second aperture and into the interior channel of the housing;

wherein the biasing mechanism comprises
- a first support wedge, said first support wedge having a long end, a short end substantially parallel to the long end, a base surface substantially perpendicular to the long end and to the short end, a pair of side surfaces substantially parallel to each other and substantially perpendicular to the long end, the short end, and the base surface, and a planar inclined surface located opposite the base surface and oriented at an acute first angle to the long end, whereby the first support wedge is configured to be placed within the interior channel of the housing, the base surface of the first support wedge is configured to be placed against and to slide along the inner back wall of the interior channel of the housing, and the side surfaces of the first support wedge are configured to be placed against and to slide along the inner side walls of the interior channel of the housing;
- a second support wedge, said second support wedge having a long end, a short end substantially parallel to the long end, a base surface substantially perpendicular to the long end and to the short end, a pair of side surfaces substantially parallel to each other and substantially perpendicular to the long end, the short end, and the base surface, and a planar inclined surface located opposite the base surface and oriented at an acute second angle to the long end, said second angle being substantially equivalent to the first angle, whereby the second support wedge is configured to be placed within the interior channel of the housing, with the inclined surface of the second support wedge configured to be placed onto and to slide against the inclined surface of the first support wedge, with the base surface of the second support wedge being the outer surface of the biasing mechanism, and with the side surfaces of the second support wedge configured to be placed against and to slide along the inner side walls of the interior channel of the housing; and
- a positioning means suitable for moving the first support wedge in a forward direction substantially parallel to the longitudinal axis of the housing and in a rearward direction opposite the forward direction;
- wherein the first and second support wedges are oriented so that the long end of the first support wedge is proximate to the short end of second support wedge and the short end of the first support wedge is proximate to the long end of the second support wedge, the side surfaces of the first support wedge are substantially coplanar with the side surfaces of the second support wedge, and the base surface of the first support wedge is substantially parallel to the base surface of the second support wedge;
- whereby the reciprocating saw blade is placed into the blade guide of the biasing mechanism of the saw blade positioner, the saw blade positioner is placed into the tube stub, and the biasing mechanism is manipulated to dynamically move its outer surface and the blade guide formed therein in either or both the first direction and the second direction, where moving the first support wedge of the biasing mechanism in the forward direction causes the long end of the first support wedge to move towards the long end of the second support wedge, with the inclined surface of the first support wedge sliding along the inclined surface of the second support wedge, thereby moving the second support wedge in the first direction away from the inner back wall of the interior channel of the housing and moving the blade guide through the access slot of the housing and out of the interior channel of the housing, and moving the first support wedge of the biasing mechanism in the rearward direction causes the short end of the first support wedge to move towards the short end of the second support wedge, with the inclined surface of the first support wedge sliding along the inclined surface of the second support wedge, thereby allowing the second support wedge to move in the second direction toward the inner back wall of the interior channel of the housing and moving the blade guide through the access slot of the housing into the interior channel of the housing, resulting in the raising or lowering of the reciprocating saw blade, so that a depth of a longitudinal cut created by the reciprocating saw blade into the interior surface of the tube stub can be precisely controlled.

10. The saw blade positioner of claim 9 wherein the retaining cap further comprises a pair of attachment flanges extending outwardly from the retaining cap, with said attachment flanges positioned on either side of the first aperture of the retaining cap, wherein each of said attachment flanges is substantially parallel to the other attachment flange and has a means for allowing attachment of a reciprocating saw to said attachment flange.

11. The saw blade positioner of claim 10 wherein the means for allowing attachment of the reciprocating saw to each of the attachment flanges is an aperture formed through each such attachment flange, through which a retaining element may be passed.

12. The saw blade positioner of claim 9 wherein the housing further comprises a pair of tracks formed along sides of the access slot of the housing at the proximate end of the housing, said tracks located adjacent to sides of the first aperture of the retaining cap; and the second support wedge of the biasing mechanism further comprises a pair of flanges extending outward from its long end, said flanges configured to be placed into the pair of tracks of the housing such that when the second support wedge moves in the first direction and in the second direction the flanges slide along the tracks.

13. The saw blade positioner of claim 9 wherein the positioning means is comprised of a threaded rod and a threaded nut, wherein a first end of the threaded rod is fixedly attached to the first support wedge at the short end of the first support wedge and the threaded rod is oriented substantially parallel to the longitudinal axis of the housing, with the threaded rod being dimensioned to fit through the second aperture of the retaining cap, with the threaded nut being dimensioned to be placed onto a second end of the threaded rod located outside of the housing and further dimensioned such that said threaded nut cannot pass through the second aperture of the retaining cap, whereby tightening the threaded nut onto the threaded rod with the threaded nut pressed against the retaining cap causes the threaded rod to move in the forward direction, thereby drawing the first support wedge in the forward direction, and loosening the threaded nut from the threaded rod allows the threaded rod to be moved in the rearward direction, thereby allowing the first support wedge to move in the rearward direction.

14. The saw blade positioner of claim 9 wherein the positioning means is comprised of a threaded rod, a retaining ring, and a threaded aperture, wherein the threaded aperture is located within the first support wedge at the short end of the first support wedge and is dimensioned to accommodated a first end of the threaded rod, with the threaded rod being dimensioned to fit through the second aperture of the retaining cap and into the threaded aperture, with the retaining ring being fixedly attached to the threaded rod at a position proximate to a second end of the threaded rod and dimensioned such that said retaining ring cannot pass through the second aperture of the retaining cap, whereby inserting the threaded rod through the second aperture of the retaining cap and into the threaded aperture and rotating the threaded rod in a clockwise direction with the retaining ring pressed against the retaining cap causes the threaded rod to pull the first support wedge in the forward direction, and rotating the threaded rod in a counter-clockwise direction allows the first support wedge to be moved in the rearward direction.

15. The saw blade positioner of claim 9 wherein the blade guide of the saw blade positioner is configured with a dovetailed cross section and the non-cutting portion of the reciprocating saw blade is configured with a cross section having substantially the same shape and dimension as the cross section of the blade guide, such that the saw blade moves laterally within the blade guide substantially parallel with the longitudinal axis of the housing but cannot move in a direction perpendicular to the longitudinal axis of the housing.

16. The saw blade positioner of claim 9 wherein the blade guide of the saw blade positioner is configured with an inverted "T" cross section and the non-cutting portion of the reciprocating saw blade is configured with a cross section having substantially the same shape and dimension as the cross section of the blade guide, such that the saw blade moves laterally within the blade guide substantially parallel with the longitudinal axis of the housing but cannot move in a direction perpendicular to the longitudinal axis of the housing.

17. The saw blade positioner of claim 9 wherein the blade guide of the saw blade positioner is configured with an inverted rounded "T" cross section and the non-cutting portion of the reciprocating saw blade is configured with a cross section having substantially the same shape and dimension as the cross section of the blade guide, such that the saw blade moves laterally within the blade guide substantially parallel with the longitudinal axis of the housing but cannot move in a direction perpendicular to the longitudinal axis of the housing.

18. The saw blade positioner of claim 9 wherein the non-cutting portion of the saw blade is configured with a rectangular cross section, with the non-cutting portion of the saw blade further having formed therein a longitudinal slot, said longitudinal slot oriented substantially parallel to a bottom edge of the saw blade; and the blade guide of the saw blade positioner is configured with a cross section having substantially the same shape and dimension as the cross section of the non-cutting portion of the saw blade, and the blade guide further comprises two or more pins, with each pin oriented substantially perpendicular to the longitudinal axis of the housing and configured to fit within the longitudinal slot of the saw blade;

whereby the saw blade moves over the two or more pins during use, with the pins retaining the saw blade in place within the blade guide such that the saw blade moves laterally within the blade guide substantially parallel with the longitudinal axis of the housing but cannot move in a direction perpendicular to the longitudinal axis of the housing.

19. The saw blade positioner of claim 18 wherein the longitudinal slot of the saw blade extends to and through a front end of the saw blade, resulting in longitudinal slot being opened at one end.

20. The saw blade positioner of claim 18 wherein the longitudinal slot of the saw blade does not extend to and through a front end of the saw blade, resulting in longitudinal slot being closed;
   wherein the two or more pins of the blade guide of the saw blade positioner are removably affixed to the blade guide;
   whereby to use the saw blade with the saw blade positioner the two or more pins of the blade guide of the saw blade positioner are removed from the blade guide, the saw blade is placed within the blade guide, and the two or more pins are passed through the longitudinal slot of the saw blade and reaffixed to the blade guide, thereby retaining the saw blade within the blade guide during use.

21. The saw blade positioner of claim 9 wherein the cutting teeth of the saw blade have a width of at least 5 millimeters.

22. A saw blade positioner for aiding in correctly positioning a reciprocating saw blade within a tube stub for making longitudinal cuts to an interior surface of the tube stub, said saw blade positioner comprising
   a housing, said housing being substantially cylindrical, having a proximate end, a distal end, and an outside diameter less than an inside diameter of the tube stub,
      said housing having an interior channel, said interior channel spanning said housing from its proximate end to its distal end, said interior channel having an inner back wall, said inner back wall being substantially planar, said interior channel having a pair of inner side walls, each located substantially perpendicular to the inner back wall and substantially parallel to each other, each inner side wall being substantially planar, and
      said housing having an access slot through an exterior surface of said housing, said access slot in communication with said interior channel of said housing, said access slot located opposite said inner back wall of said interior channel of said housing and aligned with a longitudinal axis of said housing, said access slot spanning said housing from its proximate end to its distal end, said access slot configured to allow the saw blade to be positioned at least partly within the interior channel of said housing and at least partly outside said housing;
   a biasing mechanism, said biasing mechanism being located within the interior channel of the housing, said biasing mechanism having an outer surface, said outer surface being substantially planar and oriented substantially parallel to the inner back wall of the interior channel of the housing and oriented towards and aligned with the access slot of the housing, whereby said biasing mechanism is configured to be manipulated such that it dynamically moves its outer surface in a first direction away from the inner back wall of the interior channel of the housing and dynamically moves its outer surface in a second direction towards the inner back wall of the interior channel of the housing;
   a blade guide, said blade guide formed into the outer surface of the biasing mechanism, said blade guide oriented substantially parallel to the longitudinal axis of the housing, said blade guide configured to accommodate the reciprocating saw blade such that a non-cutting portion of the reciprocating saw blade travels within the blade guide and cutting teeth of the reciprocating saw blade extend upward from the blade guide; and
   a flexible collet, said flexible collet having a substantially cylindrical exterior and a substantially conical hollow interior, with a longitudinal slot along a side of said flexible collet, said slot passing through the exterior and into the interior of the flexible collet, said flexible collet having a larger inside diameter at a proximate end and a smaller inside diameter at a distal end, with the proximate end and the distal end both being opened;
   whereby the reciprocating saw blade is placed into the blade guide of the biasing mechanism of the saw blade positioner, the saw blade positioner is placed into the tube stub, the distal end of the housing is placed into the interior of the flexible collet through the opened proximate end of the flexible collet such that the longitudinal slot of the flexible collet is aligned with the access slot of the housing, so that as the housing is placed further into the interior of the flexible collet the longitudinal slot of the flexible collet widens and the exterior of the flexible collet expands, providing the flexible collet with a greater outer diameter, and as the housing is withdrawn from the interior of the flexible collet the longitudinal slot of the flexible collet narrows and the exterior of the flexible collet contracts, providing the flexible collet with a smaller outer diameter, and the biasing mechanism is manipulated to dynamically move its outer surface and the blade guide formed therein in either or both the first direction and the second direction, thereby raising or lowering the reciprocating saw blade, so that a depth of a longitudinal cut created by the reciprocating saw blade into the interior surface of the tube stub can be precisely controlled.

23. A saw blade positioner for aiding in correctly positioning a reciprocating saw blade within a tube stub for making longitudinal cuts to an interior surface of the tube stub, said saw blade positioner comprising
   a housing, said housing being substantially cylindrical, having a proximate end, a distal end, and an outside diameter less than an inside diameter of the tube stub,
      said housing having an interior channel, said interior channel spanning said housing from its proximate end to its distal end, said interior channel having an inner back wall, said inner back wall being substantially planar, said interior channel having a pair of inner side walls, each located substantially perpendicular to the inner back wall and substantially parallel to each other, each inner side wall being substantially planar, and
      said housing having an access slot through an exterior surface of said housing, said access slot in communication with said interior channel of said housing, said access slot located opposite said inner back wall of said interior channel of said housing and aligned with a longitudinal axis of said housing, said access slot spanning said housing from its proximate end to its distal end, said access slot configured to allow the saw blade to be positioned at least partly within the interior channel of said housing and at least partly outside said housing;
   a biasing mechanism, said biasing mechanism being located within the interior channel of the housing, said biasing mechanism having an outer surface, said outer surface being substantially planar and oriented substantially parallel to the inner back wall of the interior channel of the housing and oriented towards and aligned with the access slot of the housing, whereby said biasing mechanism is configured to be manipulated such that it dynamically moves its outer surface in a first direction away from the inner back wall of the interior channel of the housing and dynamically moves its outer surface in a second direction towards the inner back wall of the interior channel of the housing;

a blade guide, said blade guide formed into the outer surface of the biasing mechanism, said blade guide oriented substantially parallel to the longitudinal axis of the housing, said blade guide configured to accommodate the reciprocating saw blade such that a non-cutting portion of the reciprocating saw blade travels within the blade guide and cutting teeth of the reciprocating saw blade extend upward from the blade guide; and a flexible collet, said flexible collet having a substantially cylindrical exterior and a substantially cylindrical hollow interior, with a longitudinal slot along a side of said flexible collet, said slot passing through the exterior and into the interior of the flexible collet, with the proximate end and the distal end both being opened;

whereby the reciprocating saw blade is placed into the blade guide of the biasing mechanism of the saw blade positioner, the saw blade positioner is placed into the tube stub, the distal end of the housing is placed into the interior of the flexible collet through the opened proximate end of the flexible collet such that the longitudinal slot of the flexible collet is aligned with the access slot of the housing, so that as the housing is placed further into the interior of the flexible collet the longitudinal slot of the flexible collet widens and the exterior of the flexible collet expands, providing the flexible collet with a greater outer diameter, and as the housing is withdrawn from the interior of the flexible collet the longitudinal slot of the flexible collet narrows and the exterior of the flexible collet contracts, providing the flexible collet with a smaller outer diameter, and the biasing mechanism is manipulated to dynamically move its outer surface and the blade guide formed therein in either or both the first direction and the second direction, thereby raising or lowering the reciprocating saw blade, so that a depth of a longitudinal cut created by the reciprocating saw blade into the interior surface of the tube stub can be precisely controlled.

* * * * *